US009866852B2

(12) United States Patent
Ramasubramonian et al.

(10) Patent No.: US 9,866,852 B2
(45) Date of Patent: Jan. 9, 2018

(54) VIDEO CODING USING END OF SEQUENCE NETWORK ABSTRACTION LAYER UNITS

(71) Applicant: QUALCOMM Incorporated, San Diego, CA (US)

(72) Inventors: Adarsh Krishnan Ramasubramonian, San Diego, CA (US); Fnu Hendry, Poway, CA (US); Ye-Kui Wang, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 302 days.

(21) Appl. No.: 14/743,327

(22) Filed: Jun. 18, 2015

(65) Prior Publication Data

US 2015/0373345 A1 Dec. 24, 2015

Related U.S. Application Data

(60) Provisional application No. 62/015,197, filed on Jun. 20, 2014.

(51) Int. Cl.
*H04N 19/169* (2014.01)
*H04N 19/105* (2014.01)
(Continued)

(52) U.S. Cl.
CPC ......... *H04N 19/188* (2014.11); *H04N 19/105* (2014.11); *H04N 19/159* (2014.11);
(Continued)

(58) Field of Classification Search
CPC .. H04N 19/188; H04N 19/105; H04N 19/159; H04N 19/187; H04N 19/30; H04N 19/70; H04N 19/172
(Continued)

(56) References Cited

U.S. PATENT DOCUMENTS

2009/0161762 A1* 6/2009 Jun ................... H04N 21/23432
375/240.16
2015/0078456 A1* 3/2015 Hannuksela ........... H04N 19/70
375/240.25
(Continued)

FOREIGN PATENT DOCUMENTS

WO WO-2007058470 A1 5/2007

OTHER PUBLICATIONS

Chen, J. et al., "SHVC Working Draft 1", 12. JCT-VC Meeting; 103. MPEG Meeting; Jan. 14-23, 2013, Geneva, 33 pages.
Hendry., et al., "MV-HEVC/SHVC HLS: Miscellaneous HLS topics", 17. JCT-VC Meeting; Mar. 27, 2014-Apr. 4, 2014, 5 pages.
International Search Report and Written Opinion—PCT/US2015/036607—ISA/EPO—dated Sep. 21, 2015.
(Continued)

*Primary Examiner* — Jay Patel
*Assistant Examiner* — Marine Matt
(74) *Attorney, Agent, or Firm* — Kilpatrick Townsend & Stockton

(57) ABSTRACT

Techniques and systems are provided for decoding and processing video data. For example, a method of decoding video data includes accessing an encoded video bitstream comprising multiple layers. The encoded video bitstream includes multiple access units, with a first access unit including an end of sequence network abstraction layer unit. A second access unit includes an intra random access point picture and is a next subsequent access unit in decoding order following the first access unit. The method further includes reinitializing decoding at the second access unit based on the second access unit being the next subsequent access unit in decoding order following the end of sequence network abstraction layer unit of the first access unit.

30 Claims, 10 Drawing Sheets

(51) Int. Cl.
*H04N 19/159* (2014.01)
*H04N 19/187* (2014.01)
*H04N 19/30* (2014.01)
*H04N 19/70* (2014.01)
*H04N 19/172* (2014.01)

(52) U.S. Cl.
CPC ........... *H04N 19/187* (2014.11); *H04N 19/30* (2014.11); *H04N 19/70* (2014.11); *H04N 19/172* (2014.11)

(58) Field of Classification Search
USPC .................................................. 375/240.26
See application file for complete search history.

(56) References Cited

U.S. PATENT DOCUMENTS

| | | | |
|---|---|---|---|
| 2015/0085938 A1* | 3/2015 | Hendry .................. | H04N 19/70 375/240.25 |
| 2015/0103927 A1* | 4/2015 | Hannuksela ......... | H04N 19/597 375/240.26 |
| 2016/0100196 A1* | 4/2016 | Wu et al. ............... | H04N 19/70 375/240.02 |
| 2016/0241850 A1* | 8/2016 | Deshpande ............ | H04N 19/70 |

OTHER PUBLICATIONS

Ramasubramonian, A.K., et al., "MV-HEVC/SHVC HLS: On CL-RAS Pictures", 15. JCT-VC Meeting; Oct. 23, 2013-Jan. 11, 2013, Geneva, 6 pages.

* cited by examiner

600

```
ACCESS AN ENCODED VIDEO BITSTREAM
COMPRISING MULTIPLE LAYERS, THE
ENCODED VIDEO BITSTREAM INCLUDING
MULTIPLE ACCESS UNITS, WHEREIN A FIRST
ACCESS UNIT INCLUDES AN END OF
SEQUENCE NETWORK ABSTRACTION LAYER
UNIT, AND WHEREIN A SECOND ACCESS UNIT
INCLUDES AN INTRA RANDOM ACCESS POINT
PICTURE AND IS A NEXT SUBSEQUENT
ACCESS UNIT IN DECODING ORDER
FOLLOWING THE FIRST ACCESS UNIT
602
```

↓

```
REINITIALIZE DECODING AT THE SECOND
ACCESS UNIT BASED ON THE SECOND
ACCESS UNIT BEING THE NEXT SUBSEQUENT
ACCESS UNIT IN DECODING ORDER
FOLLOWING THE END OF SEQUENCE
NETWORK ABSTRACTION LAYER UNIT OF THE
FIRST ACCESS UNIT
604
```

FIG. 6

VIDEO CODING USING END OF SEQUENCE NETWORK ABSTRACTION LAYER UNITS

CROSS-REFERENCE TO RELATED APPLICATIONS

This application claims the benefit of U.S. Provisional Application No. 62/015,197, filed Jun. 20, 2014, which is hereby incorporated by reference, in its entirety.

FIELD

The present disclosure generally relates to video coding, and more specifically to techniques and systems for improving video coding using end of sequence network abstraction layer units.

BACKGROUND

Many devices and systems allow video data to be processed and output for consumption. Digital video data includes large amounts of data to meet the demands of consumers and video providers. For example, consumers of video data desire video of the utmost quality, with high fidelity, resolutions, frame rates, and the like. As a result, the large amount of video data that is required to meet these demands places a burden on communication networks and devices that process and store the video data.

Various video coding techniques may be used to compress video data. Video coding is performed according to one or more video coding standards. For example, video coding standards include high efficiency video coding (HEVC), advanced video coding (AVC), moving picture experts group (MPEG) coding, or the like. Video coding generally utilizes prediction methods (e.g., inter-prediction, intra-prediction, or the like) that take advantage of redundancy present in video images or sequences. An important goal of video coding techniques is to compress video data into a form that uses a lower bit rate, while avoiding or minimizing degradations to video quality. With ever-evolving video services becoming available, encoding techniques with better coding efficiency are needed.

BRIEF SUMMARY

In some embodiments, techniques and systems are described for improving video coding using end of sequence (EOS) network abstraction layer (NAL) units. A bitstream is a series of one or more coded video sequences. A coded video sequence (CVS) includes a series of access units that starts with an access unit containing a random access point picture in the base layer and with certain properties (as detailed later in the application) up to and not including a next access unit containing a random access point picture in the base layer and with certain properties. An access unit (AU) includes one or more coded pictures and control information corresponding to the coded pictures that share the same output time. An EOS NAL unit is a NAL unit in a bitstream that indicates an end of a coded video sequence. For example, an EOS NAL unit may indicate that the NAL unit is the last NAL unit of a given CVS. In another example, an EOS NAL unit may indicate that the NAL unit is the last NAL unit of a layer of a CVS. Embodiments are described herein for modifying a decoding process so that decoding of AUs is reinitialized starting at an AU that follows an AU containing an EOS NAL unit.

According to at least one example of improving video coding using end of sequence network abstraction layer units, a method of decoding video data is provided that includes accessing an encoded video bitstream comprising multiple layers. The encoded video bitstream includes multiple access units. A first access unit includes an end of sequence network abstraction layer unit, and a second access unit includes an intra random access point picture and is a next subsequent access unit in decoding order following the first access unit. The method further includes reinitializing decoding at the second access unit based on the second access unit being the next subsequent access unit in decoding order following the end of sequence network abstraction layer unit of the first access unit.

In another example, an apparatus is provided that includes a memory configured to store video data and a processor. The processor is configured to and may access an encoded video bitstream comprising multiple layers from the memory. The encoded video bitstream includes multiple access units, with a first access unit including an end of sequence network abstraction layer unit, and a second access unit including an intra random access point picture. The second access unit is a next subsequent access unit in decoding order following the first access unit. The processor is further configured to and may reinitialize decoding at the second access unit based on the second access unit being the next subsequent access unit in decoding order following the end of sequence network abstraction layer unit of the first access unit.

In another example, a computer readable medium is provided having stored thereon instructions that when executed by a processor perform a method that includes: accessing an encoded video bitstream comprising multiple layers, the encoded video bitstream including multiple access units, wherein a first access unit includes an end of sequence network abstraction layer unit, and wherein a second access unit includes an intra random access point picture and is a next subsequent access unit in decoding order following the first access unit; and reinitializing decoding at the second access unit based on the second access unit being the next subsequent access unit in decoding order following the end of sequence network abstraction layer unit of the first access unit.

In another example, an apparatus is provided that includes means for accessing an encoded video bitstream comprising multiple layers, the encoded video bitstream including multiple access units, wherein a first access unit includes an end of sequence network abstraction layer unit, and wherein a second access unit includes an intra random access point picture and is a next subsequent access unit in decoding order following the first access unit. The apparatus further includes means for reinitializing decoding at the second access unit based on the second access unit being the next subsequent access unit in decoding order following the end of sequence network abstraction layer unit of the first access unit.

The method, apparatuses, and computer readable medium described above for decoding video data may further include reinitializing decoding of each of the multiple layers at the second access unit based on the second access unit being the next subsequent access unit in decoding order following the end of sequence network abstraction layer unit of the first access unit.

In some aspects, the first access unit includes the end of sequence network abstraction layer unit in a base layer of the encoded video bitstream and the second access unit includes the intra random access point picture in the base layer.

Decoding is reinitialized at the second access unit based on the second access unit being in the base layer and being the next subsequent access unit in decoding order following the end of sequence network abstraction layer unit of the first access unit.

In some aspects, the intra random access point picture of the second access unit includes an instantaneous decoding refresh picture. In some aspects, the intra random access point picture of the second access unit includes a clean random access picture.

In some aspects, a flag of the second access unit is set to a value when the second access unit is the next subsequent access unit in decoding order following the end of sequence network abstraction layer unit of the first access unit. The value indicates that the decoding is to be reinitialized at the second access unit. In some examples, the flag includes a NoClrasOutputFlag and the value is a value of 1.

In some aspects, reinitializing the decoding at the second access unit includes discarding one or more random access skipped leading pictures or one or more cross-layer random access skipped leading pictures associated with the second access unit.

In another example of improving video coding using end of sequence network abstraction layer units, a method of processing video data is provided that includes obtaining a first encoded video bitstream comprising multiple layers. The first encoded video bitstream includes multiple access units. The method further includes obtaining a second encoded video bitstream comprising multiple layers. The second encoded video bitstream includes multiple access units. The method further includes generating a third encoded video bitstream by combining access units in the first encoded video bitstream with access units in the second encoded video bitstream, and by inserting an end of sequence network abstraction layer unit into a first access unit of the first encoded video bitstream. A second access unit of the second encoded video bitstream includes an intra random access point picture and is a next subsequent access unit in decoding order following the first access unit with the end of sequence network abstraction layer unit. The method further includes transmitting the third encoded video bitstream. Decoding of the third encoded video bitstream is reinitialized at the second access unit based on the second access unit being the next subsequent access unit in decoding order following the end of sequence network abstraction layer unit of the first access unit.

In another example, an apparatus is provided that includes a memory configured to store video data and a processor. The processor is configured to and may obtain a first encoded video bitstream comprising multiple layers from the memory. The first encoded video bitstream includes multiple access units. The processor is further configured to and may obtain a second encoded video bitstream comprising multiple layers from the memory. The second encoded video bitstream includes multiple access units. The processor is further configured to and may generate a third encoded video bitstream by combining access units in the first encoded video bitstream with access units in the second encoded video bitstream, and by inserting an end of sequence network abstraction layer unit into a first access unit of the first encoded video bitstream. A second access unit of the second encoded video bitstream includes an intra random access point picture and is a next subsequent access unit in decoding order following the first access unit with the end of sequence network abstraction layer unit. The apparatus further includes a transmitter. The transmitter is configured to and may transmit the third encoded video bitstream. Decoding of the third encoded video bitstream is reinitialized at the second access unit based on the second access unit being the next subsequent access unit in decoding order following the end of sequence network abstraction layer unit of the first access unit.

In another example, a computer readable medium is provided having stored thereon instructions that when executed by a processor perform a method that includes: obtaining a first encoded video bitstream comprising multiple layers, the first encoded video bitstream including multiple access units; obtaining a second encoded video bitstream comprising multiple layers, the second encoded video bitstream including multiple access units; generating a third encoded video bitstream by combining access units in the first encoded video bitstream with access units in the second encoded video bitstream, and by inserting an end of sequence network abstraction layer unit into a first access unit of the first encoded video bitstream, wherein a second access unit of the second encoded video bitstream includes an intra random access point picture and is a next subsequent access unit in decoding order following the first access unit with the end of sequence network abstraction layer unit; and transmitting the third encoded video bitstream, wherein decoding of the third encoded video bitstream is reinitialized at the second access unit based on the second access unit being the next subsequent access unit in decoding order following the end of sequence network abstraction layer unit of the first access unit.

In another example, an apparatus is provided that includes means for obtaining a first encoded video bitstream comprising multiple layers, the first encoded video bitstream including multiple access units. The apparatus further includes means for obtaining a second encoded video bitstream comprising multiple layers, the second encoded video bitstream including multiple access units. The apparatus further includes means for generating a third encoded video bitstream by combining access units in the first encoded video bitstream with access units in the second encoded video bitstream, and by inserting an end of sequence network abstraction layer unit into a first access unit of the first encoded video bitstream, wherein a second access unit of the second encoded video bitstream includes an intra random access point picture and is a next subsequent access unit in decoding order following the first access unit with the end of sequence network abstraction layer unit. The apparatus further includes means for transmitting the third encoded video bitstream, wherein decoding of the third encoded video bitstream is reinitialized at the second access unit based on the second access unit being the next subsequent access unit in decoding order following the end of sequence network abstraction layer unit of the first access unit.

The method, apparatuses, and computer readable medium described above for processing video data may further include determining that the third encoded video bitstream is to be decoded, the third encoded bitstream including the access units in the first encoded video bitstream up to and inclusive of the first access unit, followed by the access units in the second encoded video bitstream starting from and inclusive of the second access unit. The method apparatuses, and computer readable medium further include determining that decoding of the second encoded video bitstream is to be reinitialized at the second access unit including the intra random access point picture, and generating the third encoded video bitstream by combining the access units in the first encoded video bitstream up to and inclusive of the first access unit with the access units in the second encoded video bitstream starting from and inclusive of the second access unit, and by inserting the end of sequence network abstraction layer unit into the first access unit.

In some aspects, the first encoded video bitstream and the second encoded video bitstream are a same encoded video bitstream, and the second access unit is a subsequent access unit in decoding order following the first access unit in the same encoded video bitstream.

In some aspects, decoding of each layer of multiple layers of the third encoded video bitstream is re-initialized at the second access unit based on the second access unit being the next subsequent access unit in decoding order following the end of sequence network abstraction layer unit of the first access unit.

In some aspects, the end of sequence network abstraction layer unit is inserted into the first access unit in a base layer of the third encoded video bitstream and the second access unit includes the intra random access point picture in the base layer. Decoding is reinitialized at the second access unit based on the second access unit being in the base layer and being the next subsequent access unit in decoding order following the end of sequence network abstraction layer unit of the first access unit.

In some aspects, the intra random access point picture of the second access unit includes an instantaneous decoding refresh picture. In some aspects, the intra random access point picture of the second access unit includes a clean random access picture.

In some aspects, a flag of the second access unit is set to a value when the second access unit is the next subsequent access unit in decoding order following the end of sequence network abstraction layer unit of the first access unit. The value indicates that the decoding is to be reinitialized at the second access unit. In some examples, the flag includes a NoClrasOutputFlag and the value is a value of 1.

In some aspects, reinitializing the decoding at the second access unit includes discarding one or more random access skipped leading pictures or one or more cross-layer random access skipped leading pictures associated with the second access unit.

This summary is not intended to identify key or essential features of the claimed subject matter, nor is it intended to be used in isolation to determine the scope of the claimed subject matter. The subject matter should be understood by reference to appropriate portions of the entire specification of this patent, any or all drawings, and each claim.

The foregoing, together with other features and embodiments, will become more apparent upon referring to the following specification, claims, and accompanying drawings.

BRIEF DESCRIPTION OF THE DRAWINGS

Illustrative embodiments of the present invention are described in detail below with reference to the following drawing figures:

FIG. 6 is a flowchart illustrating an embodiment of a process of decoding video data with an end of sequence network abstraction layer unit, in accordance with some embodiments.

DETAILED DESCRIPTION

Figure 1:
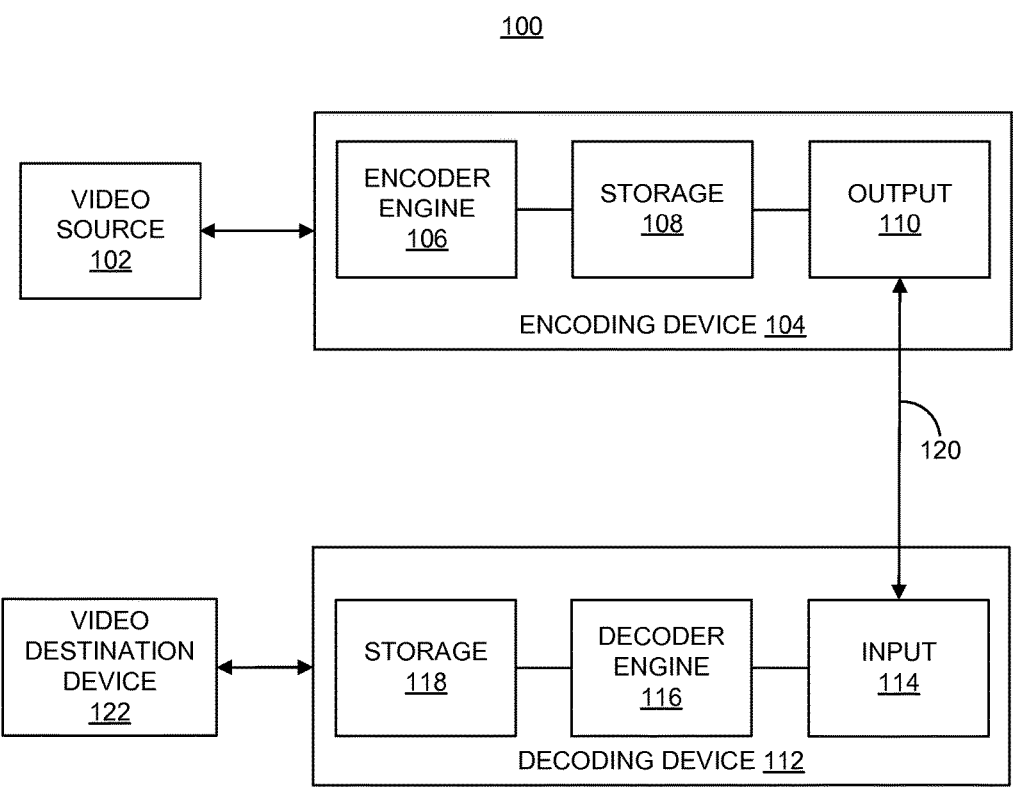
FIG. 1 is a block diagram illustrating an example of an encoding device and a decoding device, in accordance with some embodiments.

Certain aspects and embodiments of this disclosure are provided below. Some of these aspects and embodiments may be applied independently and some of them may be applied in combination as would be apparent to those of skill in the art. In the following description, for the purposes of explanation, specific details are set forth in order to provide a thorough understanding of embodiments of the invention. However, it will be apparent that various embodiments may be practiced without these specific details. The figures and description are not intended to be restrictive.

The ensuing description provides exemplary embodiments only, and is not intended to limit the scope, applicability, or configuration of the disclosure. Rather, the ensuing description of the exemplary embodiments will provide those skilled in the art with an enabling description for implementing an exemplary embodiment. It should be understood that various changes may be made in the function and arrangement of elements without departing from the spirit and scope of the invention as set forth in the appended claims.

Specific details are given in the following description to provide a thorough understanding of the embodiments. However, it will be understood by one of ordinary skill in the art that the embodiments may be practiced without these specific details. For example, circuits, systems, networks, processes, and other components may be shown as components in block diagram form in order not to obscure the embodiments in unnecessary detail. In other instances, well-known circuits, processes, algorithms, structures, and techniques may be shown without unnecessary detail in order to avoid obscuring the embodiments.

Also, it is noted that individual embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process is terminated when its operations are completed, but could have additional steps not included in a figure. A process may correspond to a method, a function, a procedure, a subroutine, a subprogram, etc. When a process corresponds to a function, its termination can correspond to a return of the function to the calling function or the main function.

The term "computer-readable medium" includes, but is not limited to, portable or non-portable storage devices, optical storage devices, and various other mediums capable of storing, containing, or carrying instruction(s) and/or data. A computer-readable medium may include a non-transitory medium in which data can be stored and that does not include carrier waves and/or transitory electronic signals propagating wirelessly or over wired connections. Examples of a non-transitory medium may include, but are not limited to, a magnetic disk or tape, optical storage media such as compact disk (CD) or digital versatile disk (DVD), flash memory, memory or memory devices. A computer-readable medium may have stored thereon code and/or machine-executable instructions that may represent a procedure, a function, a subprogram, a program, a routine, a subroutine, a module, a software package, a class, or any combination of instructions, data structures, or program statements. A code segment may be coupled to another code segment or a hardware circuit by passing and/or receiving information, data, arguments, parameters, or memory contents. Information, arguments, parameters, data, etc. may be passed, forwarded, or transmitted via any suitable means including memory sharing, message passing, token passing, network transmission, or the like.

Furthermore, embodiments may be implemented by hardware, software, firmware, middleware, microcode, hardware description languages, or any combination thereof. When implemented in software, firmware, middleware or microcode, the program code or code segments to perform the necessary tasks (e.g., a computer-program product) may be stored in a computer-readable or machine-readable medium. A processor(s) may perform the necessary tasks.

Several systems and methods of video coding using video encoders, decoders, and other coding processing devices are described herein. For example, one or more systems and methods of coding are directed to systems and methods of coding that improve the specification of an end of sequence network abstraction layer unit in multi-layer codecs, such as codecs that operate using the high efficiency video coding (HEVC) standard.

As more devices and systems provide consumers with the ability to consume digital video data, the need for efficient video coding techniques becomes more important. Video coding is needed to reduce storage and transmission requirements necessary to handle the large amounts of data present in digital video data. Various video coding techniques may be used to compress video data into a form that uses a lower bit rate while maintaining high video quality.

FIG. 1 is a block diagram illustrating an example of a system 100 including an encoding device 104 and a decoding device 112. The encoding device 104 may be part of a source device, and the decoding device 112 may be part of a receiving device. The source device and/or the receiving device may include an electronic device, such as a mobile or stationary telephone handset (e.g., smartphone, cellular telephone, or the like), a desktop computer, a laptop or notebook computer, a tablet computer, a set-top box, a television, a camera, a display device, a digital media player, a video gaming console, a video streaming device, or any other suitable electronic device. In some examples, the source device and the receiving device may include one or more wireless transceivers for wireless communications. The coding techniques described herein are applicable to video coding in various multimedia applications, including streaming video transmissions (e.g., over the Internet), television broadcasts or transmissions, encoding of digital video for storage on a data storage medium, decoding of digital video stored on a data storage medium, or other applications. In some examples, system 100 can support one-way or two-way video transmission to support applications such as video conferencing, video streaming, video playback, video broadcasting, gaming, and/or video telephony.

The encoding device 104 (or encoder) can be used to encode video data using a video coding standard or protocol to generate an encoded video bitstream. Video coding standards include ITU-T H.261, ISO/IEC MPEG-1 Visual, ITU-T H.262 or ISO/IEC MPEG-2 Visual, ITU-T H.263, ISO/IEC MPEG-4 Visual and ITU-T H.264 (also known as ISO/IEC MPEG-4 AVC), including its Scalable Video Coding (SVC) and Multiview Video Coding (MVC) extensions. A more recent video coding standard, High-Efficiency Video Coding (HEVC), has been finalized by the Joint Collaboration Team on Video Coding (JCT-VC) of ITU-T Video Coding Experts Group (VCEG) and ISO/IEC Motion Picture Experts Group (MPEG). Various extensions to HEVC deal with multi-layer video coding and are also being developed by the JCT-VC, including the multiview extension to HEVC, called MV-HEVC, and the scalable extension to HEVC, called SHVC, or any other suitable coding protocol. An HEVC draft specification is available from http://phenix.it-sudparis.eu/jct/doc_end_user/documents/17_Valencia/wg11/JCTVC-Q1003-v1.zip. A working draft of MV-HEVC is available from http://phenix.it-sudparis.eu/jct2/doc_end_user/documents/8_Valencia/wg11/JCT3V-H1002-v5.zip. A working draft of SHVC is available from http://phenix.it-sudparis.eu/jct/doc_end_user/documents/17_Valencia/wg11/JCTVC-Q1008-v2.zip.

Many embodiments described herein describe examples using the HEVC standard, or extensions thereof. However, the techniques and systems described herein may also be applicable to other coding standards, such as AVC, MPEG, extensions thereof, or other suitable coding standards. Accordingly, while the techniques and systems described herein may be described with reference to a particular video coding standard, one of ordinary skill in the art will appreciate that the description should not be interpreted to apply only to that particular standard.

A video source 102 may provide the video data to the encoding device 104. The video source 102 may be part of the source device, or may be part of a device other than the source device. The video source 102 may include a video capture device (e.g., a video camera, a camera phone, a video phone, or the like), a video archive containing stored video, a video server or content provider providing video data, a video feed interface receiving video from a video server or content provider, a computer graphics system for generating computer graphics video data, a combination of such sources, or any other suitable video source.

The video data from the video source 102 may include one or more input pictures or frames. A picture or frame is a still image that is part of a video. The encoder engine 106 (or encoder) of the encoding device 104 encodes the video data to generate an encoded video bitstream. In some examples, an encoded video bitstream (or "bitstream") is a series of one or more coded video sequences. A coded video sequence (CVS) includes a series of access units (AIls) starting with an AU that has a random access point picture in the base layer and with certain properties up to and not including a next AU that has a random access point picture in the base layer and with certain properties. For example, the certain properties of a random access point picture that starts a CVS may include a RASL flag (e.g., NoRaslOutputFlag) equal to 1. Otherwise, a random access point picture (with RASL flag equal to 0) does not start a CVS. An access unit (AU) includes one or more coded pictures and control information corresponding to the coded pictures that share the same output time. An HEVC bitstream, for example, may include one or more CVSs including data units called network abstraction layer (NAL) units. Two classes of NAL units exist in the HEVC standard, including video coding layer (VCL) NAL units and non-VCL NAL units. A VCL NAL unit includes one slice or slice segment (described below) of coded picture data, and a non-VCL NAL unit includes control information that relates to one or more coded pictures. An HEVC AU includes VCL NAL units containing coded picture data and non-VCL NAL units (if any) corresponding to the coded picture data.

NAL units may contain a sequence of bits forming a coded representation of the video data (e.g., an encoded video bitstream, a CVS of a bitstream, or the like), such as coded representations of pictures in a video. The encoder engine 106 generates coded representations of pictures by partitioning each picture into multiple slices. A slice is independent of other slices so that information in the slice is coded without dependency on data from other slices within the same picture. A slice includes one or more slice segments including an independent slice segment and, if present, one or more dependent slice segments that depend on previous slice segments. The slices are then partitioned into coding tree blocks (CTBs) of luma samples and chroma samples. A CTB of luma samples and one or more CTBs of chroma samples, along with syntax for the samples, are referred to as a coding tree unit (CTU). A CTU is the basic processing unit for HEVC encoding. A CTU can be split into multiple coding units (CUs) of varying sizes. A CU contains luma and chroma sample arrays that are referred to as coding blocks (CBs).

The luma and chroma CBs can be further split into prediction blocks (PBs). A PB is a block of samples of the luma or a chroma component that uses the same motion parameters for inter-prediction. The luma PB and one or more chroma PBs, together with associated syntax, form a prediction unit (PU). A set of motion parameters is signaled in the bitstream for each PU and is used for inter-prediction of the luma PB and the one or more chroma PBs. A CB can also be partitioned into one or more transform blocks (TBs). A TB represents a square block of samples of a color component on which the same two-dimensional transform is applied for coding a prediction residual signal. A transform unit (TU) represents the TBs of luma and chroma samples, and corresponding syntax elements.

A size of a CU corresponds to a size of the coding node and is square in shape. For example, a size of a CU may be 8×8 samples, 16×16 samples, 32×32 samples, 64×64 samples, or any other appropriate size up to the size of the corresponding CTU. The phrase "N×N" is used herein to refer to pixel dimensions of a video block in terms of vertical and horizontal dimensions (e.g., 8 pixels×8 pixels). The pixels in a block may be arranged in rows and columns. In some embodiments, blocks may not have the same number of pixels in a horizontal direction as in a vertical direction. Syntax data associated with a CU may describe, for example, partitioning of the CU into one or more PUs. Partitioning modes may differ between whether the CU is intra-prediction mode encoded or inter-prediction mode encoded. PUs may be partitioned to be non-square in shape. Syntax data associated with a CU may also describe, for example, partitioning of the CU into one or more TUs according to a CTU. A TU can be square or non-square in shape.

According to the HEVC standard, transformations may be performed using transform units (TUs). TUs may vary for different CUs. The TUs may be sized based on the size of PUs within a given CU. The TUs may be the same size or smaller than the PUs. In some examples, residual samples corresponding to a CU may be subdivided into smaller units using a quadtree structure known as residual quad tree (RQT). Leaf nodes of the RQT may correspond to TUs. Pixel difference values associated with the TUs may be transformed to produce transform coefficients. The transform coefficients may then be quantized by the encoder engine 106.

Once the pictures of the video data are partitioned into CUs, the encoder engine 106 predicts each PU using a prediction mode. The prediction is then subtracted from the original video data to get residuals (described below). For each CU, a prediction mode may be signaled inside the bitstream using syntax data. A prediction mode may include intra-prediction (or intra-picture prediction) or inter-prediction (or inter-picture prediction). Using intra-prediction, each PU is predicted from neighboring image data in the same picture using, for example, DC prediction to find an average value for the PU, planar prediction to fit a planar surface to the PU, direction prediction to extrapolate from neighboring data, or any other suitable types of prediction. Using inter-prediction, each PU is predicted using motion compensation prediction from image data in one or more reference pictures (before or after the current picture in output order). The decision whether to code a picture area using inter-picture or intra-picture prediction may be made, for example, at the CU level.

A PU may include data related to the prediction process. For example, when the PU is encoded using intra-prediction, the PU may include data describing an intra-prediction mode for the PU. As another example, when the PU is encoded using inter-prediction, the PU may include data defining a motion vector for the PU. The data defining the motion vector for a PU may describe, for example, a horizontal component of the motion vector, a vertical component of the motion vector, a resolution for the motion vector (e.g., one-quarter pixel precision or one-eighth pixel precision), a reference picture to which the motion vector points, and/or a reference picture list (e.g., List 0, List 1, or List C) for the motion vector.

The encoder 104 may then perform transformation and quantization. For example, following prediction, the encoder engine 106 may calculate residual values corresponding to the PU. Residual values may comprise pixel difference values. Any residual data that may be remaining after prediction is performed is transformed using a block transform, which may be based on discrete cosine transform, discrete sine transform, an integer transform, a wavelet transform, or other suitable transform function. In some cases, one or more block transforms (e.g., sizes 32×32, 16×16, 8×8, 4×4, or the like) may be applied to residual data in each CU. In some embodiments, a TU may be used for the transform and quantization processes implemented by the encoder engine 106. A given CU having one or more PUs may also include one or more TUs. As described in further detail below, the residual values may be transformed into transform coefficients using the block transforms, and then may be quantized and scanned using TUs to produce serialized transform coefficients for entropy coding.

In some embodiments following intra-predictive or inter-predictive coding using PUs of a CU, the encoder engine 106 may calculate residual data for the TUs of the CU. The PUs may comprise pixel data in the spatial domain (or pixel domain). The TUs may comprise coefficients in the transform domain following application of a block transform. As previously noted, the residual data may correspond to pixel difference values between pixels of the unencoded picture and prediction values corresponding to the PUs. Encoder engine 106 may form the TUs including the residual data for the CU, and may then transform the TUs to produce transform coefficients for the CU.

The encoder engine 106 may perform quantization of the transform coefficients. Quantization provides further compression by quantizing the transform coefficients to reduce the amount of data used to represent the coefficients. For example, quantization may reduce the bit depth associated with some or all of the coefficients. In one example, a coefficient with an n-bit value may be rounded down to an m-bit value during quantization, with n being greater than m.

Once quantization is performed, the coded bitstream includes quantized transform coefficients, prediction information (e.g., prediction modes, motion vectors, or the like), partitioning information, and any other suitable data, such as other syntax data. The different elements of the coded bitstream may then be entropy encoded by the encoder engine 106. In some examples, the encoder engine 106 may utilize a predefined scan order to scan the quantized transform coefficients to produce a serialized vector that can be entropy encoded. In some examples, encoder engine 106 may perform an adaptive scan. After scanning the quantized transform coefficients to form a one-dimensional vector, the encoder engine 106 may entropy encode the one-dimensional vector. For example, the encoder engine 106 may use context adaptive variable length coding, context adaptive binary arithmetic coding, syntax-based context-adaptive binary arithmetic coding, probability interval partitioning entropy coding, or another suitable entropy encoding technique.

The output 110 of the encoding device 104 may send the NAL units making up the encoded video data over the communications link 120 to the decoding device 112 of the receiving device. The input 114 of the decoding device 112 may receive the NAL units. The communications link 120 may include a signal transmitted using a wireless network, a wired network, or a combination of a wired and wireless network. A wireless network may include any wireless interface or combination of wireless interfaces and may include any suitable wireless network (e.g., the Internet or other wide area network, a packet-based network, WiFi™, radio frequency (RF), UWB, WiFi-Direct, cellular, Long-Term Evolution (LTE), WiMax™, or the like). A wired network may include any wired interface (e.g., fiber, ethernet, powerline ethernet, ethernet over coaxial cable, digital signal line (DSL), or the like). The wired and/or wireless networks may be implemented using various equipment, such as base stations, routers, access points, bridges, gateways, switches, or the like. The encoded video data may be modulated according to a communication standard, such as a wireless communication protocol, and transmitted to the receiving device.

In some examples, the encoding device 104 may store encoded video data in storage 108. The output 110 may retrieve the encoded video data from the encoder engine 106 or from the output 110. Storage 108 may include any of a variety of distributed or locally accessed data storage media. For example, the storage 108 may include a hard drive, a storage disc, flash memory, volatile or non-volatile memory, or any other suitable digital storage media for storing encoded video data.

The input 114 receives the encoded video data and may provide the video data to the decoder engine 116 or to storage 118 for later use by the decoder engine 116. The decoder engine 116 may decode the encoded video data by entropy decoding (e.g., using an entropy decoder) and extracting the elements of the coded video sequence making up the encoded video data. The decoder engine 116 may then rescale and perform an inverse transform on the encoded video data. Residues are then passed to a prediction stage of the decoder engine 116. The decoder engine 116 then predicts a block of pixels (e.g., a PU). In some examples, the prediction is added to the output of the inverse transform.

The decoding device 112 may output the decoded video to a video destination device 112, which may include a display or other output device for displaying the decoded video data to a consumer of the content. In some aspects, the video destination device 122 may be part of the receiving device that includes the decoding device 112. In some aspects, the video destination device 122 may be part of a separate device other than the receiving device.

In some embodiments, the video encoding device 104 and/or the video decoding device 112 may be integrated with an audio encoding device and audio decoding device, respectively. The video encoding device 104 and/or the video decoding device 112 may also include other hardware or software that is necessary to implement the coding techniques described above, such as one or more microprocessors, digital signal processors (DSPs), application specific integrated circuits (ASICs), field programmable gate arrays (FPGAs), discrete logic, software, hardware, firmware or any combinations thereof. The video encoding device 104 and the video decoding device 112 may be integrated as part of a combined encoder/decoder (codec) in a respective device. An example of specific details of the encoding device 104 is described below with reference to FIG. 9. An example of specific details of the decoding device 112 is described below with reference to FIG. 10.

Extensions to the HEVC standard include the Multiview Video Coding extension, referred to as MV-HEVC, and the Scalable Video Coding extension, referred to as SHVC. The MV-HEVC and SHVC extensions share the concept of layered coding, with different layers being included in the encoded video bitstream. Each layer in a coded video sequence is addressed by a unique layer identifier (ID). A layer ID may be present in a header of a NAL unit to identify a layer with which the NAL unit is associated. In MV-HEVC, different layers usually represent different views of the same scene in the video bitstream. In SHVC, different scalable layers are provided that represent the video bitstream in different spatial resolutions (or picture resolution) or in different reconstruction fidelities. The scalable layers may include a base layer (with layer ID=0) and one or more enhancement layers (with layer IDs=1, 2, . . . n). The base layer may conform to a profile of the first version of HEVC, and represents the lowest available layer in a bitstream. The enhancement layers have increased spatial resolution, temporal resolution or frame rate, and/or reconstruction fidelity (or quality) as compared to the base layer. The enhancement layers are hierarchically organized and may (or may not) depend on lower layers. In some examples, the different layers may be coded using a single standard codec (e.g., all layers are encoded using HEVC, SHVC, or other coding standard). In some examples, different layers may be coded using a multi-standard codec. For example, a base layer may be coded using AVC, while one or more enhancement layers may be coded using SHVC and/or MV-HEVC extensions to the HEVC standard.

In general, a layer includes a set of VCL NAL units and a corresponding set of non-VCL NAL units. The NAL units are assigned a particular layer ID value. Layers can be hierarchical in the sense that a layer may depend on a lower layer. A layer set refers to a set of layers represented within a bitstream that are self-contained, meaning that the layers within a layer set can depend on other layers in the layer set in the decoding process, but do not depend on any other layers for decoding. Accordingly, the layers in a layer set can form an independent bitstream that can represent video content. The set of layers in a layer set may be obtained from another bitstream by operation of a sub-bitstream extraction process. A layer set may correspond to the set of layers that is to be decoded when a decoder wants to operate according to certain parameters.

As previously described, an HEVC bitstream includes a group of NAL units, including VCL NAL units and non-VCL NAL units. Non-VCL NAL units may contain parameter sets with high-level information relating to the encoded video bitstream, in addition to other information. For example, a parameter set may include a video parameter set (VPS), a sequence parameter set (SPS), and a picture parameter set (PPS). The goal of the parameter sets is bit rate efficiency, error resiliency, and providing systems layer interfaces. Each slice references a single active PPS, SPS, and VPS to access information that the decoding device 112 may use for decoding the slice. An identifier (ID) may be coded for each parameter set, including a VPS ID, an SPS ID, and a PPS ID. An SPS includes an SPS ID and a VPS ID. A PPS includes a PPS ID and an SPS ID. Each slice header includes a PPS ID. Using the IDs, active parameter sets can be identified for a given slice.

A PPS includes information that applies to all slices in a given picture. Because of this, all slices in a picture refer to the same PPS. Slices in different pictures may also refer to the same PPS. An SPS includes information that applies to all pictures in a same coded video sequence or bitstream. A coded video sequence is a series of access units that starts with a random access point picture (e.g., an instantaneous decoding refresh (IDR) picture or broken link access (BLA) picture, or other appropriate random access point picture) and includes all access units up to but not including the next random access point picture (or the end of the bitstream). The information in an SPS does not typically change from picture to picture within a coded video sequence. All pictures in a coded video sequence use the same SPS. The VPS includes information that applies to all layers within a coded video sequence or bitstream. The VPS includes a syntax structure with syntax elements that apply to entire coded video sequences. In some embodiments, the VPS, SPS, or PPS may be transmitted in-band with the encoded bitstream. In some embodiments, the VPS, SPS, or PPS may be transmitted out-of-band in a separate transmission than the NAL units containing coded video data.

VCL NAL units include coded picture data forming the coded video bitstream. Various types of VCL NAL units are defined in the HEVC standard, as illustrated in Table A below.

TABLE A

| NAL UNIT TYPE VALUE | NAL UNIT TYPE SYNTAX NAME | CONTENT OF NAL UNIT (PICTURE) | DESCRIPTION OF PICTURE |
|---|---|---|---|
| TRAILING NON-IRAP PICTURES | | | |
| 0 | TRAIL_N | Coded Slice (or slice segment) of a Non-TSA, non-STSA Trailing Picture | Sub-Layer Non-Reference |
| 1 | TRAIL_R | Coded Slice (or slice segment) of a Non-TSA, non-STSA Trailing Picture | Sub-Layer Reference |
| 2 | TSA_N | Coded Slice (or slice segment) of a Temporal Sub-Layer Access (TSA) Picture | Sub-Layer Non-Reference |
| 3 | TSA_R | Coded Slice (or slice segment) of a TSA Picture | Sub-Layer Reference |
| 4 | STSA_N | Coded Slice (or slice segment) of a Step-Wise Temporal Sub-Layer (STSA) Picture | Sub-Layer Non-Reference |
| 5 | STSA_R | Coded Slice (or slice segment) of a STSA Picture | Sub-Layer Reference |
| LEADING PICTURES | | | |
| 6 | RADL_N | Coded Slice (or slice segment) of a Random Access Decodable Leading (RADL) Picture | Sub-Layer Non-Reference |
| 7 | RADL_R | Coded Slice (or slice segment) of a RADL Picture | Sub-Layer Reference |
| 8 | RASL_N | Coded Slice (or slice segment) of a Random Access Skipped Leading (RASL) Picture | Sub-Layer Non-Reference |
| 9 | RASL_R | Coded Slice (or slice segment) of a RASL Picture | Sub-Layer Reference |
| RESERVED | | | |
| 10-15 | RSV | Reserved non-IRAP | |
| 22-23 | RSV | Reserved IRAP | |
| 24-31 | RSV | Reserved non-IRAP | |

TABLE A-continued

| NAL UNIT TYPE VALUE | NAL UNIT TYPE SYNTAX NAME | CONTENT OF NAL UNIT (PICTURE) | DESCRIPTION OF PICTURE |
|---|---|---|---|
| | | IRAP PICTURES | |
| 16 | BLA_W_LP | Coded Slice (or slice segment) of a Broken Link Access (BLA) Picture | May Have Leading Pictures |
| 17 | BLA_W_RADL | Coded Slice (or slice segment) of a BLA Picture | May Have RADL Leading Pictures |
| 18 | BLA_N_LP | Coded Slice (or slice segment) of a BLA Picture | Without Leading Pictures |
| 19 | IDR_W_RADL | Coded Slice (or slice segment) of an Instantaneous Decoding Refresh (IDR) Picture | May Have Leading Pictures |
| 20 | IDR_N_LP | Coded Slice (or slice segment) of an IDR Picture | Without Leading Pictures |
| 21 | CRA | Coded Slice (or slice segment) of a Clean Random Access (CRA) Picture | May Have Leading Pictures |

In a single-layer bitstream, as defined in the first HEVC standard, VCL NAL units contained in an AU have the same NAL unit type value, with the NAL unit type value defining the type of AU and the type of coded picture within the AU. For example, VCL NAL units of a particular AU may include instantaneous decoding refresh (IDR) NAL units (value 19), making the AU an IDR AU and the coded picture of the AU an IDR picture. The given type of a VCL NAL unit is related to the picture, or portion thereof, contained in the VCL NAL unit (e.g., a slice or slice segment of a picture in a VCL NAL unit). Three classes of pictures are defined in the HEVC standard, including leading pictures, trailing pictures, and intra random access (IRAP) pictures. In a multi-layer bitstream, VCL NAL units of a picture within an AU have the same NAL unit type value and the same type of coded picture. For example, the picture that contains VCL NAL units of type IDR is said to be an IDR picture in the AU. In another example, when an AU contains a picture that is an IRAP picture at the base layer (the layer ID equal to 0), the AU is an IRAP AU.

Figure 2:
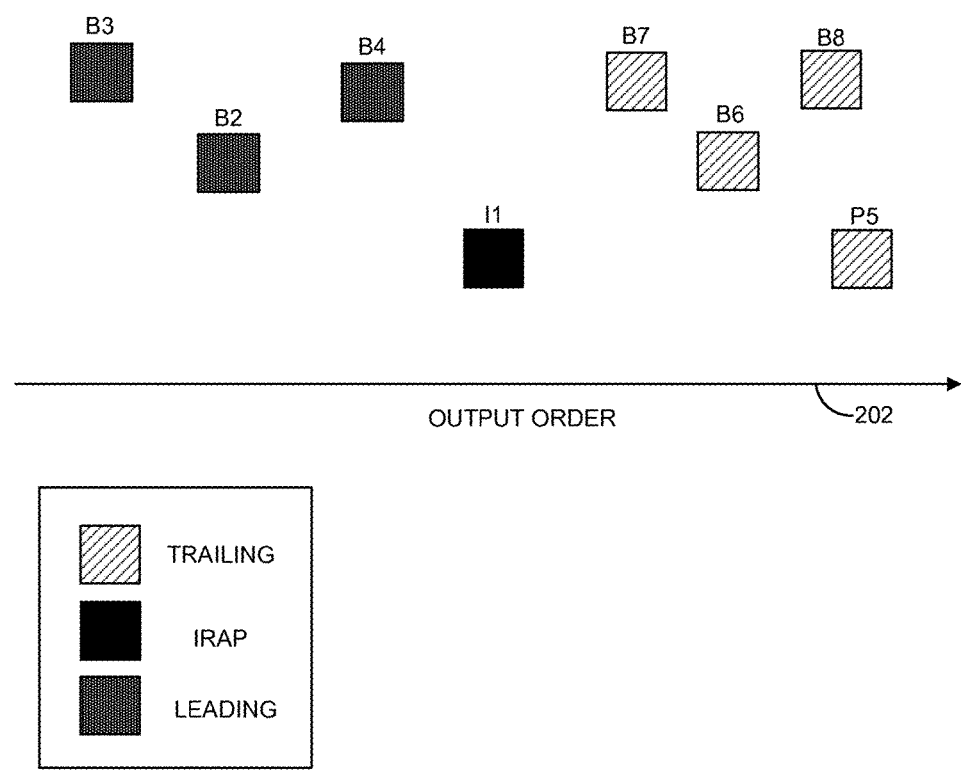
FIG. 2 is an example of pictures of an encoded video bitstream, in accordance with some embodiments.

FIG. 2 is an example of pictures of an encoded video bitstream including an IRAP picture I1 and leading and trailing pictures associated with the IRAP picture I1. The pictures are linearly displayed in output order in the direction of the arrow 202, and the numbers 1-8 (I1 B2, B3, B4, P5, B6, B7, B8) indicate the decoding order of the pictures. IRAP pictures provide points in a bitstream where decoding can begin. For example, decoding can begin at an IRAP picture so that pictures following the IRAP picture in output order, inclusive, can be output even if all pictures that precede the IRAP picture in decoding order are discarded from the bitstream (e.g., due to bitstream splicing, or the like). Because it is possible to start decoding at an IRAP picture, an IRAP picture is not dependent on any other picture in the bitstream. For example, IRAP pictures belong to temporal sub-layer 0 and are coded without using content of any other pictures as reference data (e.g., intra-prediction coding is used). The first picture of a bitstream is an IRAP picture, and other IRAP pictures may also be present in the bitstream. In a multi-layer bitstream, IRAP pictures that have a layer ID greater than 0 (layers other than a base layer) may use inter-layer prediction. For example, the IRAP pictures may use inter-layer prediction based on pictures that belong to the same access unit and have lower layer ID.

Pictures B2, B3, and B4 include leading pictures of the IRAP picture I1. A leading picture is a picture that follows an IRAP picture in decoding order, but precedes the IRAP picture in output order. As illustrated in FIG. 2, leading pictures B2, B3, and B4 are after IRAP picture I1 in decoding order, and come before the IRAP picture I1 in output order. In some embodiments, leading pictures use one of the leading picture NAL Unit types 6-9 shown in Table A above.

Pictures P5, B6, B7, and B8 including trailing pictures of the IRAP picture I1. A trailing picture is a picture that follows an IRAP picture in decoding order and in output order. As illustrated in FIG. 2, trailing pictures P5, B6, B7, and B8 follow the IRAP picture I1 in decoding order and also in output order. Trailing pictures use one of the trailing picture NAL Unit types 0-5 shown in Table A above.

Leading pictures and trailing pictures are associated with the closest IRAP picture in decoding order (picture I1 in FIG. 2). In some embodiments, the decoding order of an IRAP picture and its associated trailing and leading pictures is defined based on certain conditions on leading and trailing pictures. For example, trailing pictures depend on an associated IRAP picture and other trailing pictures of the same IRAP picture. Trailing pictures associated with an IRAP picture do not depend on any leading pictures, and also do not depend on any trailing pictures of previous IRAP pictures. Leading pictures associated with an IRAP picture precede trailing pictures (in decoding order) that are associated with the same IRAP picture. Based on these conditions, and similar other conditions that are not listed here, the decoding order of the IRAP picture I1 and its associated trailing and leading pictures is the IRAP picture I1, followed by the trailing pictures B2, B3, B4, followed by the leading pictures P5, B6, B7, B8.

Various types of trailing pictures, leading pictures, and IRAP pictures are available. For example, trailing pictures include temporal sub-layer access (TSA) pictures, step-wise temporal sub-layer access (STSA) pictures, and ordinary trailing pictures (TRAIL). A TSA picture indicates a temporal sub-layer switching point at which switching can occur up to any higher sub-layer. A STSA picture indicates a temporal sub-layer switching point at which switching can occur to the sub-layer with the same temporal layer identifier as the STSA picture. TSA and STSA pictures belong to temporal sub-layers with temporal identifiers greater than 0. A TRAIL picture can belong to any temporal sub-layer, and does not indicate a temporal sub-layer switching point. In multi-layer bitstreams, STSA pictures that belong to the layer with layer ID greater than 0 can also belong to the temporal sub-layer with temporal sub-layer equal to 0.

Leading picture types include random access decodable leading (RADL) pictures and random access skipped leading (RASL) pictures. A RADL picture is a leading picture that is decodable when random access is performed at the IRAP picture with which the RADL picture is associated. In some embodiments, RADL pictures reference, for prediction purposes, only the associated IRAP picture and other RADL pictures that are also associated with the IRAP picture. A RASL picture is a leading picture that may not be decodable when random access is performed from an associated IRAP picture. A RASL picture is not decodable when a picture that the RASL picture uses for reference precedes the IRAP picture in decoding order. The RASL picture is not decodable because a decoder performing random access at the IRAP picture will not decode the picture that precedes the IRAP picture in decoding order, and thus will also not decode the RASL picture. RASL pictures can reference other types of pictures (e.g., IRAP pictures, other RASL pictures, RADL pictures, or the like). In some examples, only RASL pictures can be dependent on other RASL pictures, in which case every picture that depends on a RASL picture is a RASL picture.

Different types of IRAP pictures are used for coding video data, including Instantaneous Decoding Refresh (IDR) pictures, Clean Random Access (CRA) pictures, and Broken Link Access (BLA) pictures. An IDR picture is an intra-picture (I-picture) that completely refreshes or reinitializes the decoding process at the decoder and starts a new CVS. In some examples, an IDR picture and any picture following the IDR picture in decoding order cannot be dependent on any picture that comes before the IDR picture in decoding order. In some cases, RASL pictures are not allowed to be associated with an IDR picture. A CRA picture is also an I-picture. A CRA picture does not refresh the decoder and does not begin a new CVS, allowing leading pictures of the CRA picture to depend on pictures that come before the CRA picture in decoding order. In some examples, a CRA picture may have associated RADL pictures and RASL pictures. Random access may be done at a CRA picture by decoding the CRA picture, leading pictures associated with the CRA picture that are not dependent on any picture coming before the CRA picture in decoding order, and all associated pictures that follow the CRA in both decoding and output order. In some cases, a CRA picture may not have associated leading pictures. In the multi-layer case, an IDR or a CRA picture that belongs to a layer with layer ID greater than 0 may be a P-picture or a B-picture, but these pictures can only use inter-layer prediction from other pictures that belong to the same access unit as the IDR or CRA picture, and that have a layer ID less than the layer containing the IDR or CRA picture.

IRAP pictures provide the ability to splice bitstreams together. For example, an encoder, a bitstream editor (or "editor"), a splicer, or other network device may splice bitstreams together using an IRAP picture. Bitstream splicing allows seamless switching from one compressed video bitstream to another compressed video bitstream. For example, splicing occurs by replacing a first IRAP AU and all subsequent AUs of a first compressed bitstream with a second IRAP AU and subsequent AUs of a second compressed bitstream. CRA pictures can be used for splicing compressed video bitstreams (in addition to random access, as previously described). For example, the first and second IRAP AUs may include CRA pictures. In some embodiments, IDR pictures can be used for splicing compressed video bitstreams. In some cases, it is not necessary that the first AU should contain an IRAP picture. In multi-layer bitstreams, splicing can occur when the second AU contains an IRAP picture that belongs to base layer.

In some cases, after splicing occurs, a RASL picture that follows a CRA picture in decoding order may not be decodable in the event the RASL picture references one or more pictures that are no longer in the bitstream after splicing. In some examples, an encoder, editor, splicer, or other device may discard the RASL pictures during splicing. In other examples, a broken link splicing option may be used to indicate that a picture order count timeline, as well as prediction from pictures preceding the CRA picture (in decoding order) that RASL pictures may depend on, are broken when splicing is done.

A third type of IRAP picture, called a BLA picture, is used to inform a decoder when a splicing operation has occurred so that the decoder can determine whether associated RASL pictures should be decoded. During splicing, the CRA picture in the new bitstream that is used for splicing is treated as a BLA picture. When broken link splicing is performed, RASL pictures may be kept, and a decoder that comes across such a BLA picture may discard the RASL pictures associated with the BLA picture. In the event the decoder encounters a CRA picture, the decoder will decode RASL pictures associated with the CRA picture. When a decoder comes across a BLA picture or a CRA picture, the decoder will decode all RADL pictures associated with the BLA and CRA pictures, respectively. A BLA picture refreshes or reinitializes the decoding process at the decoder and starts a new CVS. In some embodiments, a BLA picture may be used even when splicing has not occurred.

The encoder, an editor, or other device sending a bitstream to a decoder may indicate to the decoder that CRA picture is to be handled as a BLA picture. In one example, during splicing, the CRA picture in the new bitstream that is used for splicing is renamed as a BLA picture. For instance, a device (editor, splicer, or other network entity) may change a CRA NAL unit type to a BLA NAL unit type. In this instance, the device changes the bits of the bitstream to change the NAL unit type.

In another example, a BLA flag may be provided that indicates to the decoder that a CRA picture is to be handled as a BLA picture. In one example, the BLA flag may be a HandleCraAsBlaFlag. The BLA flag may be set to a certain value to inform a decoder to handle a particular CRA picture as a BLA picture. In some embodiments, the BLA flag may be set to a value of 1 to indicate to the decoder that the CRA picture is to be handled as a BLA picture. In the event the value of the BLA flag is 0, the decoder will treat the CRA picture as a CRA picture (and not a BLA picture). In other embodiments, the BLA flag may be set to a value of 0 to indicate that the CRA picture is to be handled as a BLA picture. In some cases, the BLA flag is sent in-band with the encoded video bitstream (e.g., sent by an HEVC codec in one or more non-VCL NAL units). In some cases, the BLA flag is an externally specified indication that can be sent by a device other than the codec that provides the encoded video bitstream. For example, an external source (e.g., an AVC codec, an editor, a splicer, or other device) may send the BLA flag in an out-of-band communication.

Figure 3:
FIG. 3 is an example of access units of an encoded video bitstream, in accordance with some embodiments.

FIG. 3 illustrates an example of an encoded video bitstream 300 with a BLA flag. The encoded video bitstream 300 includes access units N through N+9. The access units N through N+9 include various pictures in a first layer L0 (e.g., with a layer ID=0) and a second layer L1 (e.g., with a layer ID=1). In some embodiments, the first layer L0 may include a base layer, and the second layer L1 may include an enhancement layer. The access units N through N+9 are illustrated in decoding order, as indicated by the arrow 302. The access units N, N+1, N+2, N+5, N+7, N+8, and N+9 contain trailing pictures in both layers L0 and L1. The access units N+3 and N+4 include leading pictures in the layer L0 and trailing pictures in the layer L1. The leading pictures may include RASL pictures. The access unit N+6 includes a trailing picture in the layer 0 and a CRA picture in the layer L1. The access unit N+2 includes a CRA picture with a BLA flag set to a value of 1 in the layer L0 and a trailing picture in the layer L1. Upon receiving and decoding the bitstream 300, a decoder may treat the CRA picture in the N+2 access unit as a BLA picture.

A reinitialization flag may indicate to a decoder that the decoding process is to be refreshed or reinitialized at a particular IRAP picture of an IRAP AU. In one example, the reinitialization flag may be a NoClrasOutputFlag. In some embodiments, the reinitialization flag may cause decoding to be reinitialized across all layers of an encoded video bitstream. The reinitialization flag may be derived to be a certain value indicating to a decoder to reinitialize the decoding process. In some embodiments, a value of 1 for the reinitialization flag may indicate to the decoder that the decoding process is to be reinitialized. In the event the value of the reinitialization flag is derived by the decoder to be 0, the decoder will continue to reference pictures that occur earlier in decoding order and that are decoded before the IRAP AU (e.g., when decoding RASL pictures, cross-layer RASL pictures, or the like). In other embodiments, a value of 0 for the reinitialization flag may indicate that decoding is to be reinitialized. In some cases, the reinitialization flag may be derived by the decoder as part of the decoding process. For example, the reinitialization flag may be provided in the encoded video bitstream. In some cases, the reinitialization flag may be specified to the decoder by an external source. For example, the reinitialization flag may be provided in an out-of-band communication separately from the encoded video bitstream. The external source may include an encoder (using a coding protocol other than an HEVC protocol), a decoder (using a coding protocol other than an HEVC protocol), an editor, a splicer, or other network device that provides the reinitialization flag. In one example, a decoder (using a coding protocol other than an HEVC protocol) may decode the reinitialization flag, and may provide the reinitialization flag to an HEVC decoder.

The decoder may determine the value of the reinitialization flag, and may reinitialize the decoding process based on the determined value. The decoder may reinitialize the decoding process by beginning a new prediction boundary, starting with the pictures at the IRAP AU and continuing with pictures that follow the IRAP AU in decoding order. In some cases, pictures preceding the IRAP AU in decoding order are not available for reference after the decoding process is reinitialized. For example, the decoder may reinitialize the decoding process at the IRAP AU, and discard all pictures that precede the IRAP AU in decoding order. In other cases, the reinitialization is performed, at least in part, by discarding one or more RASL pictures or one or more cross-layer random access skipped leading (CL-RAS) pictures. CL-RAS pictures are pictures associated with an IRAP AU, and that belong to layers with a layer ID greater than 0 (layers other than a base layer). In some cases, CL-RAS pictures may not be correctly decodable when decoding starts or reinitializes from the IRAP AU. The CL-RAS pictures, in such cases, may not be correctly decodable because one or more of these picture may reference (directly or indirectly) a picture that precedes the IRAP AU in decoding order and that is thus unavailable.

In some embodiments, when the BLA flag is set to a value indicating that a CRA picture that belongs to the base layer is to be handled as a BLA picture (as illustrated in FIG. 3), the reinitialization flag is derived by the decoder to be a value indicating that the decoding process is to be reinitialized at the IRAP AU containing the CRA picture that is treated as a BLA picture. For example, upon determining that the access unit N+2 includes a CRA picture with BLA flag set to 1 (indicating to the decoder to handle the CRA picture as a BLA picture), the decoder will derive the reinitialization flag to be equal to 1 at the N+2 access unit. In such embodiments, the decoder will reinitialize the decoding process at the N+2 access unit based on the determination that the BLA flag of the CRA picture is set to 1.

In some embodiments, an AU may contain an end of sequence (EOS) NAL unit. In some examples, an EOS NAL unit can be inserted into a bitstream to indicate that NAL unit as the last NAL unit of a particular CVS. In some examples, an EOS NAL unit may be used on a layer-specific basis. In such examples, an EOS NAL unit may be assigned a layer identifier (ID). An EOS NAL unit assigned a particular layer ID is used to indicate that NAL unit as the end of a sequence for the particular layer to which the layer ID is also assigned. In some cases, the access unit immediately following an access unit with an EOS NAL unit contains an IRAP picture.

Figure 4:
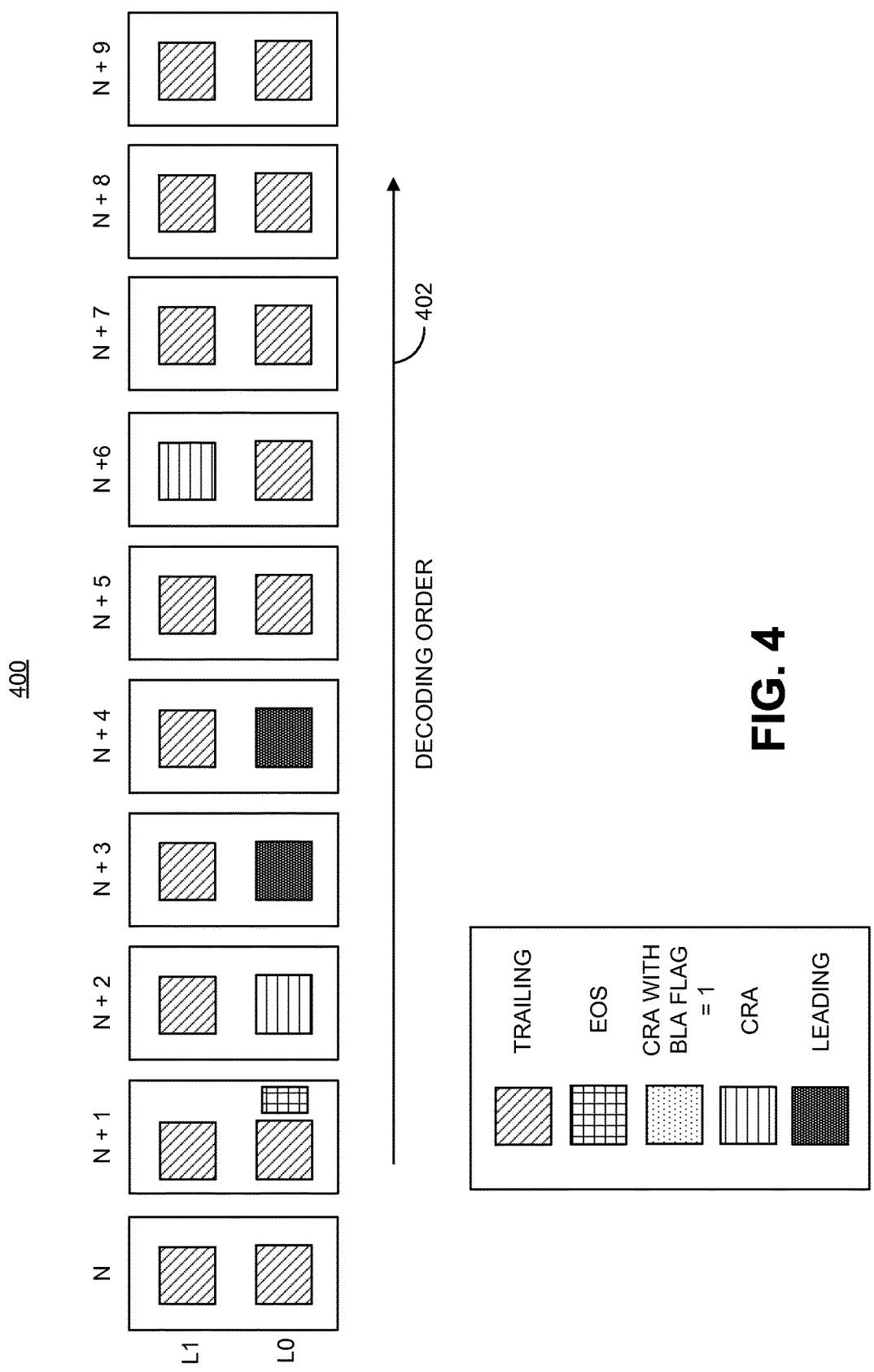
FIG. 4 is another example of access units of an encoded video bitstream, in accordance with some embodiments.

FIG. 4 illustrates an example of an encoded video bitstream 400 with an EOS NAL unit and a CRA picture following the EOS NAL unit in decoding order. The encoded video bitstream 400 includes access units N through N+9. The access units N through N+9 include various pictures in a first layer L0 (e.g., with a layer ID=0) and a second layer L1 (e.g., with a layer ID=1). In some embodiments, the first layer L0 may include a base layer, and the second layer L1 may include an enhancement layer. The access units N through N+9 are illustrated in decoding order, as indicated by the arrow 402. The access units N, N+1, N+5, N+7, N+8, and N+9 contain trailing pictures in both layers L0 and L1. The access units N+3 and N+4 include leading pictures in the layer L0 and trailing pictures in the layer L1. The leading pictures may include RASL pictures. The access unit N+2 includes a CRA picture in the layer L0 and a trailing picture in the layer L1. The access unit N+6 includes a trailing picture in the layer 0 and a CRA picture in the layer L1. In addition to the trailing pictures in the access unit N+1, an EOS NAL unit is inserted into the access unit N+1 to indicate an end of a sequence of NAL units (e.g., an end of an entire CVS, or an end a sequence for the layer L0).

Figure 5:
FIG. 5 is another example of access units of an encoded video bitstream, in accordance with some embodiments.

FIG. 5 illustrates another example of an encoded video bitstream 500 with an EOS NAL unit and an IDR picture following the EOS NAL unit in decoding order. The encoded video bitstream 500 includes access units N through N+9. The access units N through N+9 include various pictures in a first layer L0 (e.g., with a layer ID=0) and a second layer L1 (e.g., with a layer ID=1). In some embodiments, the first layer L0 may include a base layer, and the second layer L1 may include an enhancement layer. The access units N through N+9 are illustrated in decoding order, as indicated by the arrow 502. The access units N, N+1, N+3, N+4, N+8, and N+9 contain trailing pictures in both layers L0 and L1. The access units N+6 and N+7 include trailing pictures in the layer L0 and leading pictures in the layer L1. The leading pictures may include RASL pictures. The access unit N+2 includes an IDR picture in the layer L0 and a trailing picture in the layer L1. The access unit N+5 includes a trailing picture in the layer 0 and a CRA picture in the layer L1. In addition to the trailing pictures in the access unit N+1, an EOS NAL unit is inserted into the access unit N+1 to indicate an end of a sequence of NAL units (e.g., an end of an entire CVS, or an end a sequence for the layer L0).

An IRAP picture following an EOS NAL unit should be treated as the beginning of a new decoding process, and the reinitialization flag should be derived to be a value indicating that decoding is to be reinitialized. However, according to the HEVC standard, when an IRAP picture (e.g., a CRA picture or an IDR picture) follows an EOS NAL unit, the reinitialization flag is not derived by the decoder to be equal to 1. For example, as described above with respect to FIG. 3, when a CRA picture with a layer ID (e.g., nuh_layer_id) equal to 0 has a BLA flag with a value of 1, the value of the reinitialization flag is derived to be equal to 1. However, as illustrated in FIG. 4 and FIG. 5, when a CRA picture or an IDR picture with a layer ID equal to 0 is the first picture that succeeds an EOS NAL unit in decoding order (as illustrated by the CRA picture of the access unit N+2), the value of the reinitialization flag is not derived to be equal to 1 for the CRA picture or the IDR picture.

Furthermore, one purpose for using an EOS NAL unit is to indicate termination of temporal prediction chain. For example, as illustrated in FIG. 5, the EOS NAL unit in the N+1 access unit enables indication of a splice point in the bitstream 500. In some examples, a value of a flag in the IDR picture in the N+2 access unit may be set to indicate a splice point. However, if the flag is not set to indicate reinitialization, and the reinitialization flag is not derived to be equal to a value indicating that decoding is to be reinitialized (which it is not under the current HEVC standard), the temporal prediction chain will not be reinitialized by the decoder.

Embodiments described herein include modifying the decoding process so that when an IRAP picture follows an EOS NAL unit, a decoder will derive the reinitialization flag to be a value indicating that decoding is to be reinitialized at the IRAP picture. The IRAP picture may include a CRA picture (as shown in FIG. 4) or an IDR picture (as shown in FIG. 5). The decoder may reinitialize decoding across some or all of the layers starting at the access unit containing the IRAP picture that follows the EOS NAL unit in decoding order.

In some examples, the value of the reinitialization flag is derived to be equal to 1 (indicating reinitialization of the decoding process) for a CRA picture that is the first picture succeeding an EOS NAL unit in decoding order. In some cases, the value of the reinitialization flag may be derived as 1 for a CRA picture with layer ID equal to 0 that is the first picture succeeding an EOS NAL unit in decoding order. In such examples, CRA pictures (e.g., for any layer ID or with a layer ID equal to 0) that are contained in the first IRAP AU following an EOS NAL unit in decoding order and CRA pictures with a BLA flag equal to 1 will be handled by a decoder in the same way as the decoder handles a BLA picture. In some examples, decoding may be reinitialized for all layers. In other examples, decoding may be reinitialized only for layers with layer IDs that are equal to or higher than the layer ID of the CRA picture.

Using FIG. 4 as an example, the CRA picture in access unit N+2 is the first picture that follows the EOS NAL unit of the access unit N+1 in decoding order. The decoder may determine that the access unit N+2 contains the CRA picture, and that the access unit N+2 includes the first picture that succeeds the EOS NAL unit in decoding order. The decoder may then derive the reinitialization flag for the CRA picture to be a value (e.g., a value of 1) indicating that decoding is to be reinitialized at the CRA picture. In some embodiments, the decoder may further base the decision to derive the value of the reinitialization flag based on the CRA picture having a layer ID equal to 0 (indicating that it is in the base layer L0). In such embodiments, the decoder may not derive the value of the reinitialization flag to be 1 (or other value indicating that decoding is to be reinitialized) for a CRA picture following the EOS NAL unit in decoding order in the event the CRA picture has a layer ID equal to a number other than 0 (e.g., a CRA picture in one or more enhancement layers).

In some examples, when the first access unit after an EOS NAL unit (which may indicate a splice point) in decoding order is an IRAP access unit containing an IDR picture, the value of the reinitialization flag for the IDR picture is derived to be equal to 1 (indicating reinitialization of the decoding process). In some cases, the value of the reinitialization flag is derived to be equal to 1 for an IDR picture with a layer ID equal to 0 that is the first access unit after an EOS NAL unit in decoding order. In some examples, decoding may be reinitialized for all layers when the reinitialization flag is derived to be equal to 1. In other examples, decoding may be reinitialized only for layers with layer IDs that are equal to or higher than the layer ID of the IDR picture.

Referring to FIG. 5 as an example, the access unit N+2 contains an IDR picture and is the first access unit following the EOS NAL unit of access unit N+1 in decoding order. The decoder may determine that the access unit N+2 contains the IDR picture, and that the access unit N+2 includes the first picture that succeeds the EOS NAL unit in decoding order. The decoder may then derive the reinitialization flag for the IDR picture to be a value (e.g., a value of 1) indicating that decoding is to be reinitialized at the IDR picture. In some embodiments, the decoder may further base the decision to derive the value of the reinitialization based on the IDR picture having a layer ID equal to 0 (indicating that it is in the base layer L0). In such embodiments, the decoder may not derive the value of the reinitialization flag to be 1 (or other value indicating that decoding is to be reinitialized) for an IDR picture following the EOS NAL unit in decoding order in the event the IDR picture has a layer ID equal to a number other than 0 (e.g., an IDR picture in one or more enhancement layers)

Examples of changes to the HEVC standard implementing the above-described techniques may include:
When the current picture is an IRAP picture and has nuh_layer_id equal to 0, the following applies:
The variable NoClrasOutputFlag is specified as follows:
If the current picture is the first picture in the bitstream, NoClrasOutputFlag is set equal to 1.
Otherwise, if the current picture is a BLA picture or a CRA picture with HandleCraAsBlaFlag equal to 1, NoClrasOutputFlag is set equal to 1.
Otherwise, if the current picture is a CRA picture and the current access unit is the first access unit that follows an end of sequence NAL unit in decoding order, NoClrasOutputFlag is set equal to 1.

Otherwise, if the current picture is an IDR picture with cross_layer_bla_flag is equal to 1, NoClrasOutputFlag is set equal to 1.

Otherwise, if some external means, not specified in this Specification, is available to set NoClrasOutputFlag, NoClrasOutputFlag is set by the external means.

Otherwise, NoClrasOutputFlag is set equal to 0.

When NoClrasOutputFlag is equal to 1, the variable LayerInitializedFlag[i] is set equal to 0 for all values of i from 0 to vps_max_layer_id, inclusive, and the variable FirstPicInLayerDecodedFlag[i] is set equal to 0 for all values of i from 0 to vps_max_layer_id, inclusive.

Alternatively, the derivation of NoClrasOutputFlag is modified as follows:

When the current picture is an IRAP picture and has nuh_layer_id equal to 0, the following applies:

The variable NoClrasOutputFlag is specified as follows:

If the current picture is the first picture in the bitstream, NoClrasOutputFlag is set equal to 1.

Otherwise, if the current picture is a BLA picture or a CRA picture with HandleCraAsBlaFlag equal to 1, NoClrasOutputFlag is set equal to 1.

Otherwise, if the current picture is a IRAP picture and the current access unit is the first access unit that follows an end of sequence NAL unit in decoding order, NoClrasOutputFlag is set equal to 1.

Otherwise, if the current picture is an IDR picture with cross_layer_bla_flag is equal to 1, NoClrasOutputFlag is set equal to 1.

Otherwise, if some external means, not specified in this Specification, is available to set NoClrasOutputFlag, NoClrasOutputFlag is set by the external means.

Otherwise, NoClrasOutputFlag is set equal to 0.

Alternatively, the derivation of HandleCraAsBlaFlag is modified as follows:

When the current picture is an IRAP picture, the variable HandleCraAsBlaFlag is derived as specified in the following:

If the current picture is a CRA picture and is the first picture that follows an end of sequence NAL unit in decoding order, the variable HandleCraAsBlaFlag is set equal to 1.

Otherwise if some external means not specified in this Specification is available to set the variable HandleCraAsBlaFlag to a value for the current picture, the variable HandleCraAsBlaFlag is set equal to the value provided by the external means.

Otherwise, the variable HandleCraAsBlaFlag is set equal to 0.

FIG. 6 illustrates an embodiment of a process 600 of decoding video data. The process 600 is implemented to reinitialize decoding in view of an end of sequence network abstraction layer unit. In some aspects, the process 600 may be performed by a computing device or an apparatus, such as the decoding device 112 shown in FIG. 1 or in FIG. 10. For example, the computing device or apparatus may include a decoder, or a processor, microprocessor, microcomputer, or other component of a decoder that is configured to carry out the steps of process 600.

Process 600 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 600 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 602, the process 600 of decoding video data includes accessing an encoded video bitstream comprising multiple layers. The encoded video bitstream includes multiple access units, wherein a first access unit includes an end of sequence network abstraction layer unit, and wherein a second access unit includes an intra random access point picture and is a next subsequent access unit in decoding order following the first access unit. In some examples, the encoded video bitstream includes the bitstream 400 shown in FIG. 4. In such examples, the first access unit includes the N+1 access unit, the second access unit includes the N+2 access unit, and the intra random access point picture of the second access unit includes a clean random access (CRA) picture. In some examples, the encoded video bitstream includes the bitstream 500 shown in FIG. 5. In such examples, the first access unit includes the N+1 access unit, the second access unit includes the N+2 access unit, and the intra random access point picture of the second access unit includes an instantaneous decoding refresh (IDR) picture. One of ordinary skill in the art will appreciate that the encoded video bitstream may include encoded video bitstreams other than those described herein.

At 604, the process 600 includes reinitializing decoding at the second access unit based on the second access unit being the next subsequent access unit in decoding order following the end of sequence network abstraction layer unit of the first access unit. In some embodiments, the process 600 may include reinitializing decoding of each of the multiple layers at the second access unit based on the second access unit being the next subsequent access unit in decoding order following the end of sequence network abstraction layer unit of the first access unit. For example, decoding will be reinitialized for all of the layers of the encoded video bitstream.

In some embodiments, the first access unit includes the end of sequence network abstraction layer unit in a base layer of the encoded video bitstream and the second access unit includes the intra random access point picture in the base layer. In these embodiments, decoding is reinitialized at the second access unit based on the second access unit being in the base layer and being the next subsequent access unit in decoding order following the end of sequence network abstraction layer unit of the first access unit.

In some embodiments, a flag (e.g., a reinitialization flag) of the second access unit is set to or derived to be a value when the second access unit is the next subsequent access unit in decoding order following the end of sequence network abstraction layer unit of the first access unit. The value of the flag indicates that the decoding is to be reinitialized at the second access unit. In some examples, the flag includes a NoClrasOutputFlag and the value is a value of 1. In some examples, the value is a value of 0.

In some embodiments, reinitializing the decoding at the second access unit includes discarding one or more random access skipped leading pictures or one or more cross-layer random access skipped leading pictures associated with the second access unit.

Figure 7:
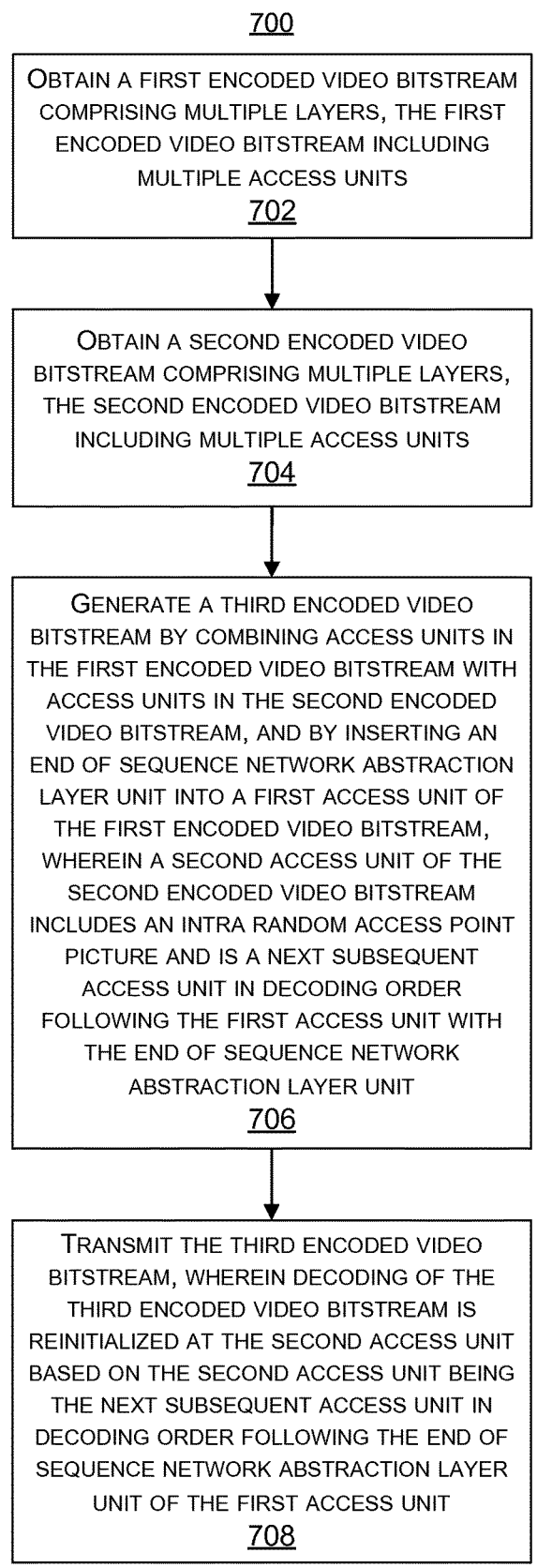
FIG. 7 is a flowchart illustrating an embodiment of a process of processing video data using an end of sequence network abstraction layer unit, in accordance with some embodiments.

FIG. 7 illustrates an embodiment of a process 700 of processing video data. The process 700 is implemented to generate an encoded video bitstream including an end of sequence network abstraction layer unit so that a decoding process is reinitialized at a decoder. In some aspects, the process 700 may be performed by a computing device or an apparatus, such as a bitstream editor, a bitstream splicer, or an encoder, such as the encoding device 104 shown in FIG. 1 or in FIG. 9. For example, the computing device or apparatus may include a bitstream editor, a bitstream splicer, an encoder, or a processor, microprocessor, microcomputer, or other component of such devices that is configured to carry out the steps of process 700.

Process 700 is illustrated as a logical flow diagram, the operation of which represent a sequence of operations that can be implemented in hardware, computer instructions, or a combination thereof. In the context of computer instructions, the operations represent computer-executable instructions stored on one or more computer-readable storage media that, when executed by one or more processors, perform the recited operations. Generally, computer-executable instructions include routines, programs, objects, components, data structures, and the like that perform particular functions or implement particular data types. The order in which the operations are described is not intended to be construed as a limitation, and any number of the described operations can be combined in any order and/or in parallel to implement the processes.

Additionally, the process 700 may be performed under the control of one or more computer systems configured with executable instructions and may be implemented as code (e.g., executable instructions, one or more computer programs, or one or more applications) executing collectively on one or more processors, by hardware, or combinations thereof. As noted above, the code may be stored on a computer-readable or machine-readable storage medium, for example, in the form of a computer program comprising a plurality of instructions executable by one or more processors. The computer-readable or machine-readable storage medium may be non-transitory.

At 702, the process 700 of processing video data includes obtaining a first encoded video bitstream comprising multiple layers, the first encoded video bitstream including multiple access units. The first encoded video bitstream may be coded using a coding technique, such as HEVC, AVC, MPEG, or other appropriate video coding techniques.

At 704, the process 700 includes obtaining a second encoded video bitstream comprising multiple layers, the second encoded video bitstream including multiple access units. The second encoded video bitstream may be coded using a coding technique, such as HEVC, AVC, MPEG, or other appropriate video coding techniques.

At 706, the process 700 includes generating a third encoded video bitstream by combining access units in the first encoded video bitstream with access units in the second encoded video bitstream, and by inserting an end of sequence network abstraction layer unit into a first access unit of the first encoded video bitstream. A second access unit of the second encoded video bitstream includes an intra random access point picture and is a next subsequent access unit in decoding order following the first access unit with the end of sequence network abstraction layer unit. In some examples, the third encoded video bitstream may be generated by splicing the first and second encoded video bitstreams together at intra random access point pictures of the first and second encoded video bitstreams. For example, the splicing may occur by replacing an access unit containing an intra random access point picture and all subsequent access units of the first encoded video bitstream with the second access unit containing the intra random access point picture and subsequent access units of the second encoded video bitstream. The process 700 inserts the end of sequence network abstraction layer unit into the first access unit so that decoding of the third encoded video bitstream will be reinitialized at the second access unit. The decoding reinitialization will occur based on the second access unit being the next subsequent access unit in decoding order following the end of sequence network abstraction layer unit of the first access unit.

In some embodiments, generating the third encoded video bitstream includes determining that the third encoded video bitstream is to be decoded, the third encoded bitstream including the access units in the first encoded video bitstream up to and inclusive of the first access unit, followed by the access units in the second encoded video bitstream starting from and inclusive of the second access unit. Generating the third encoded video bitstream further includes determining that decoding of the second encoded video bitstream is to be reinitialized at the second access unit including the intra random access point picture, and generating the third encoded video bitstream by combining the access units in the first encoded video bitstream up to and inclusive of the first access unit with the access units in the second encoded video bitstream starting from and inclusive of the second access unit, and by inserting the end of sequence network abstraction layer unit into the first access unit.

At 708, the process 700 includes transmitting the third encoded video bitstream, wherein decoding of the third encoded video bitstream is reinitialized at the second access unit based on the second access unit being the next subsequent access unit in decoding order following the end of sequence network abstraction layer unit of the first access unit. In some embodiments, decoding of each layer of multiple layers of the third encoded video bitstream is re-initialized at the second access unit based on the second access unit being the next subsequent access unit in decoding order following the end of sequence network abstraction layer unit of the first access unit. For example, decoding will be reinitialized for all of the layers of the encoded video bitstream.

In some embodiments, the first encoded video bitstream and the second encoded video bitstream are separate encoded video bitstreams that are spliced together, as described above. In some embodiments, the first encoded video bitstream and the second encoded video bitstream are a same encoded video bitstream, and the second access unit is a subsequent access unit in decoding order following the first access unit in the same encoded video bitstream. For example, the first encoded video bitstream may be a first portion of a bitstream from time t1 to time t3, and the second encoded video bitstream may be a second portion of the same bitstream from time t2 to t4, where $t1<t2<t3<t4$. The first and second portions may be spliced or stitched together, for example, when a user seeks back in time in the encoded video bitstream to time t2 For example, the first and second portions of the encoded video bitstream may be spliced by replacing an access unit containing an intra random access point picture at time t3 and all subsequent access units with an access unit containing an intra random access point picture at time t2 and subsequent access units.

In some embodiments, the intra random access point picture of the second access unit includes an instantaneous decoding refresh picture. In some embodiments, the intra random access point picture of the second access unit includes a clean random access picture.

In some embodiments, the end of sequence network abstraction layer unit is inserted into the first access unit in a base layer of the third encoded video bitstream and the second access unit includes the intra random access point picture in the base layer. In these embodiments, decoding is reinitialized at the second access unit based on the second access unit being in the base layer and being the next subsequent access unit in decoding order following the end of sequence network abstraction layer unit of the first access unit.

In some embodiments, a flag (e.g., a reinitialization flag) of the second access unit is set to a value when the second access unit is the next subsequent access unit in decoding order following the end of sequence network abstraction layer unit of the first access unit. The value of the flag indicates that the decoding is to be reinitialized at the second access unit. In some examples, the flag includes a NoClrasOutputFlag and the value is a value of 1. In some examples, the value is a value of 0.

In some embodiments, reinitializing the decoding at the second access unit includes discarding one or more random access skipped leading pictures or one or more cross-layer random access skipped leading pictures associated with the second access unit.

Using the above-described techniques of using an end of sequence network abstraction layer unit, the decoding process used by decoders can be modified to more effectively reinitialize decoding at certain portions of an encoded video bitstream. For example, the decoding process is modified (e.g. derivation of a reinitialization flag) so that decoding of a CRA picture that is the first picture that follows an EOS NAL unit in decoding order is defined similarly as a CRA picture with a BLA flag equal to 1 (or other value indicating that the CRA picture is to be handled as a BLA picture). Further, the decoding process is modified so that decoding of all the layers is reinitialized (e.g. reinitialization flag is set equal to 1) at an access unit that follows an access unit containing EOS NAL unit in decoding order. Such modifications simplify splicing operations by not requiring system entities to change any syntax element in the bitstream, and by not requiring any flag to be provided by external means for this purpose.

In further embodiments, techniques and systems are described for modifying the decoding process so that a value of a RASL flag is derived to be a certain value only in certain situations. In some examples, an IRAP picture may have a corresponding RASL flag (e.g., a NoRaslOutputFlag). When an IRAP picture has a RASL flag equal to 1, the RASL pictures associated with that IRAP are not output and may not be correctly decodable because the RASL pictures may contain references to pictures that are not present in the bitstream (e.g., after splicing, random access, or other function causing pictures to no long be present in the bitstream). In some cases, the RASL flag may be set to 0 to indicate that RASL pictures are not correctly decodable.

Figure 8:
FIG. 8 is an example of access units of an encoded video bitstream, in accordance with some embodiments.

FIG. 8 illustrates an example of an encoded video bitstream 800 with an EOS NAL unit and an IDR picture following the EOS NAL unit in decoding order. The encoded video bitstream 800 includes access units N through N+9. The access units N through N+9 include various pictures in a first layer L0 (e.g., with a layer ID=0) and a second layer L1 (e.g., with a layer ID=1). In some embodiments, the first layer L0 may include a base layer, and the second layer L1 may include an enhancement layer. The access units N through N+9 are illustrated in decoding order, as indicated by the arrow 802. The access units N, N+1, N+8, and N+9 contain trailing pictures in both layers L0 and L1. The access units N+3 and N+4 contain trailing pictures in the layers L0 and no pictures in the layer L1. The access units N+6 and N+7 include trailing pictures in the layer L0 and leading pictures in the layer L1. The leading pictures may include RASL pictures or RADL pictures. The access unit N+2 includes an IDR picture in the layer L0 and a no picture in the layer L1. In some examples, the access unit N+2 may include a different IRAP picture, such as a CRA picture or a BLA picture. The access unit N+5 includes a trailing picture in the layer 0 and a CRA picture in the layer L1. In addition to the trailing pictures in the access unit N+1, an EOS NAL unit is inserted into the access unit N+1 to indicate an end of a sequence of NAL units (e.g., an end of an entire CVS, or an end a sequence for the layer L0).

In some examples, when the current picture with a particular layer ID is an IDR picture, a BLA picture, the first picture with the particular layer ID in the bitstream in decoding order, or the first picture with that particular layer ID that follows an EOS NAL unit in decoding order, the RASL flag may be set to 1 (e.g., derived by the decoder to be a value of 1). According to the HEVC standard, an EOS NAL unit affects decoding of the pictures in the first access unit that succeeds the EOS NAL unit in decoding order, and also affects subsequent access units that succeed the first access unit. For example, if an IRAP picture of a particular layer is the first picture in that layer following an EOS NAL unit, then the RASL flag of the picture is equal to 1 even when that IRAP picture is contained in an access unit that is not immediately following the EOS NAL unit in decoding order. For example, in the bitstream 800 illustrated in FIG. 8, the presence of the EOS in the access unit N+1 results in the CRA picture in the access unit N+5 to have a RASL flag equal to 1.

Embodiments are described herein for restricting the EOS NAL unit to only directly affect the decoding of pictures in the first subsequent access unit that follows the EOS NAL unit. For example, the decoding process is modified (e.g. derivation of a RASL flag) so that an EOS NAL unit directly affects the decoding of only those pictures that belong to the first access unit that follows the access unit containing the EOS NAL unit in decoding order. For example, the RASL flag is derived to be 1 only for the next subsequent access unit following the access unit containing the EOS NAL unit in decoding order. Accordingly, only the RASL pictures associated with the next subsequent access unit are indicated as not being correctly decodable. In some embodiments, the decoding process is modified (e.g. derivation of RASL flag) so that the an EOS NAL unit directly affects the decoding of only the pictures with a Layer ID equal to 0 (e.g., a base layer) that belong to the first access unit that follows the access unit containing the EOS NAL unit in decoding order.

Using FIG. 8 as an example, the restriction on the EOS NAL unit is effective because if the access unit N+2 is not a splicing point (e.g., a point at which two bitstreams are spliced together, a point at which two portions of a same bitstream are spliced together, or the like), the RASL pictures at the access units N+6 and N+7 may be correctly decoded (e.g., the leading pictures in the N+6 and N+7 access units may be marked as RADL pictures). In the case where the AU N+2 is a splice point, the current derivation of the RASL flag based on LayerInitializedFlag in the HEVC standard ensures that the CRA picture in the access unit N+5 has a RASL flag derived as equal to 1.

Examples of changes to the HEVC standard implementing the above-described techniques relating to the RASL flag may include:

When the current picture is an IRAP picture, the following applies:

If the current picture with a particular value of nuh_layer_id is an IDR picture, a BLA picture, the first picture with that particular value of nuh_layer_id in the bitstream in decoding order, or the access unit containing the picture with that particular value of nuh_layer_id is the first access unit that follows an end of sequence NAL unit in decoding order, the variable NoRaslOutputFlag is set equal to 1.

Otherwise, if LayerInitializedFlag[nuh_layer_id] is equal to 0 and

LayerInitializedFlag[refLayerId] is equal to 1 for all values of refLayerId equal to RefLayerId[nuh_layer_id][j], where j is in the range of 0 to NumDirectRefLayers[nuh_layer_id]−1, inclusive, the variable NoRaslOutputFlag is set equal to 1.

Otherwise, the variable NoRaslOutputFlag is set equal to HandleCraAsBlaFlag.

The coding techniques discussed herein may be implemented in an example video encoding and decoding system (e.g., system 100). A system includes a source device that provides encoded video data to be decoded at a later time by a destination device. In particular, the source device provides the video data to destination device via a computer-readable medium. The source device and the destination device may comprise any of a wide range of devices, including desktop computers, notebook (i.e., laptop) computers, tablet computers, set-top boxes, telephone handsets such as so-called "smart" phones, so-called "smart" pads, televisions, cameras, display devices, digital media players, video gaming consoles, video streaming device, or the like. In some cases, the source device and the destination device may be equipped for wireless communication.

The destination device may receive the encoded video data to be decoded via the computer-readable medium. The computer-readable medium may comprise any type of medium or device capable of moving the encoded video data from source device to destination device. In one example, computer-readable medium may comprise a communication medium to enable source device to transmit encoded video data directly to destination device in real-time. The encoded video data may be modulated according to a communication standard, such as a wireless communication protocol, and transmitted to destination device. The communication medium may comprise any wireless or wired communication medium, such as a radio frequency (RF) spectrum or one or more physical transmission lines. The communication medium may form part of a packet-based network, such as a local area network, a wide-area network, or a global network such as the Internet. The communication medium may include routers, switches, base stations, or any other equipment that may be useful to facilitate communication from source device to destination device.

In some examples, encoded data may be output from output interface to a storage device. Similarly, encoded data may be accessed from the storage device by input interface. The storage device may include any of a variety of distributed or locally accessed data storage media such as a hard drive, Blu-ray discs, DVDs, CD-ROMs, flash memory, volatile or non-volatile memory, or any other suitable digital storage media for storing encoded video data. In a further example, the storage device may correspond to a file server or another intermediate storage device that may store the encoded video generated by source device. Destination device may access stored video data from the storage device via streaming or download. The file server may be any type of server capable of storing encoded video data and transmitting that encoded video data to the destination device. Example file servers include a web server (e.g., for a website), an FTP server, network attached storage (NAS) devices, or a local disk drive. Destination device may access the encoded video data through any standard data connection, including an Internet connection. This may include a wireless channel (e.g., a Wi-Fi connection), a wired connection (e.g., DSL, cable modem, etc.), or a combination of both that is suitable for accessing encoded video data stored on a file server. The transmission of encoded video data from the storage device may be a streaming transmission, a download transmission, or a combination thereof.

The techniques of this disclosure are not necessarily limited to wireless applications or settings. The techniques may be applied to video coding in support of any of a variety of multimedia applications, such as over-the-air television broadcasts, cable television transmissions, satellite television transmissions, Internet streaming video transmissions, such as dynamic adaptive streaming over HTTP (DASH), digital video that is encoded onto a data storage medium, decoding of digital video stored on a data storage medium, or other applications. In some examples, system may be configured to support one-way or two-way video transmission to support applications such as video streaming, video playback, video broadcasting, and/or video telephony.

In one example the source device includes a video source, a video encoder, and a output interface. The destination device may include an input interface, a video decoder, and a display device. The video encoder of source device may be configured to apply the techniques disclosed herein. In other examples, a source device and a destination device may include other components or arrangements. For example, the source device may receive video data from an external video source, such as an external camera. Likewise, the destination device may interface with an external display device, rather than including an integrated display device.

The example system above merely one example. Techniques for processing video data in parallel may be performed by any digital video encoding and/or decoding device. Although generally the techniques of this disclosure are performed by a video encoding device, the techniques may also be performed by a video encoder/decoder, typically referred to as a "CODEC." Moreover, the techniques of this disclosure may also be performed by a video preprocessor. Source device and destination device are merely examples of such coding devices in which source device generates coded video data for transmission to destination device. In some examples, the source and destination devices may operate in a substantially symmetrical manner such that each of the devices include video encoding and decoding components. Hence, example systems may support one-way or two-way video transmission between video devices, e.g., for video streaming, video playback, video broadcasting, or video telephony.

The video source may include a video capture device, such as a video camera, a video archive containing previously captured video, and/or a video feed interface to receive video from a video content provider. As a further alternative, the video source may generate computer graphics-based data as the source video, or a combination of live video, archived video, and computer-generated video. In some cases, if video source is a video camera, source device and destination device may form so-called camera phones or video phones. As mentioned above, however, the techniques described in this disclosure may be applicable to video coding in general, and may be applied to wireless and/or wired applications. In each case, the captured, pre-captured, or computer-generated video may be encoded by the video encoder. The encoded video information may then be output by output interface onto the computer-readable medium.

As noted the computer-readable medium may include transient media, such as a wireless broadcast or wired network transmission, or storage media (that is, non-transitory storage media), such as a hard disk, flash drive, compact disc, digital video disc, Blu-ray disc, or other computer-readable media. In some examples, a network server (not shown) may receive encoded video data from the source device and provide the encoded video data to the destination device, e.g., via network transmission. Similarly, a computing device of a medium production facility, such as a disc stamping facility, may receive encoded video data from the source device and produce a disc containing the encoded video data. Therefore, the computer-readable medium may be understood to include one or more computer-readable media of various forms, in various examples.

The input interface of the destination device receives information from the computer-readable medium. The information of the computer-readable medium may include syntax information defined by the video encoder, which is also used by the video decoder, that includes syntax elements that describe characteristics and/or processing of blocks and other coded units, e.g., group of pictures (GOP). A display device displays the decoded video data to a user, and may comprise any of a variety of display devices such as a cathode ray tube (CRT), a liquid crystal display (LCD), a plasma display, an organic light emitting diode (OLED) display, or another type of display device. Various embodiments of the invention have been described.

Figure 9:
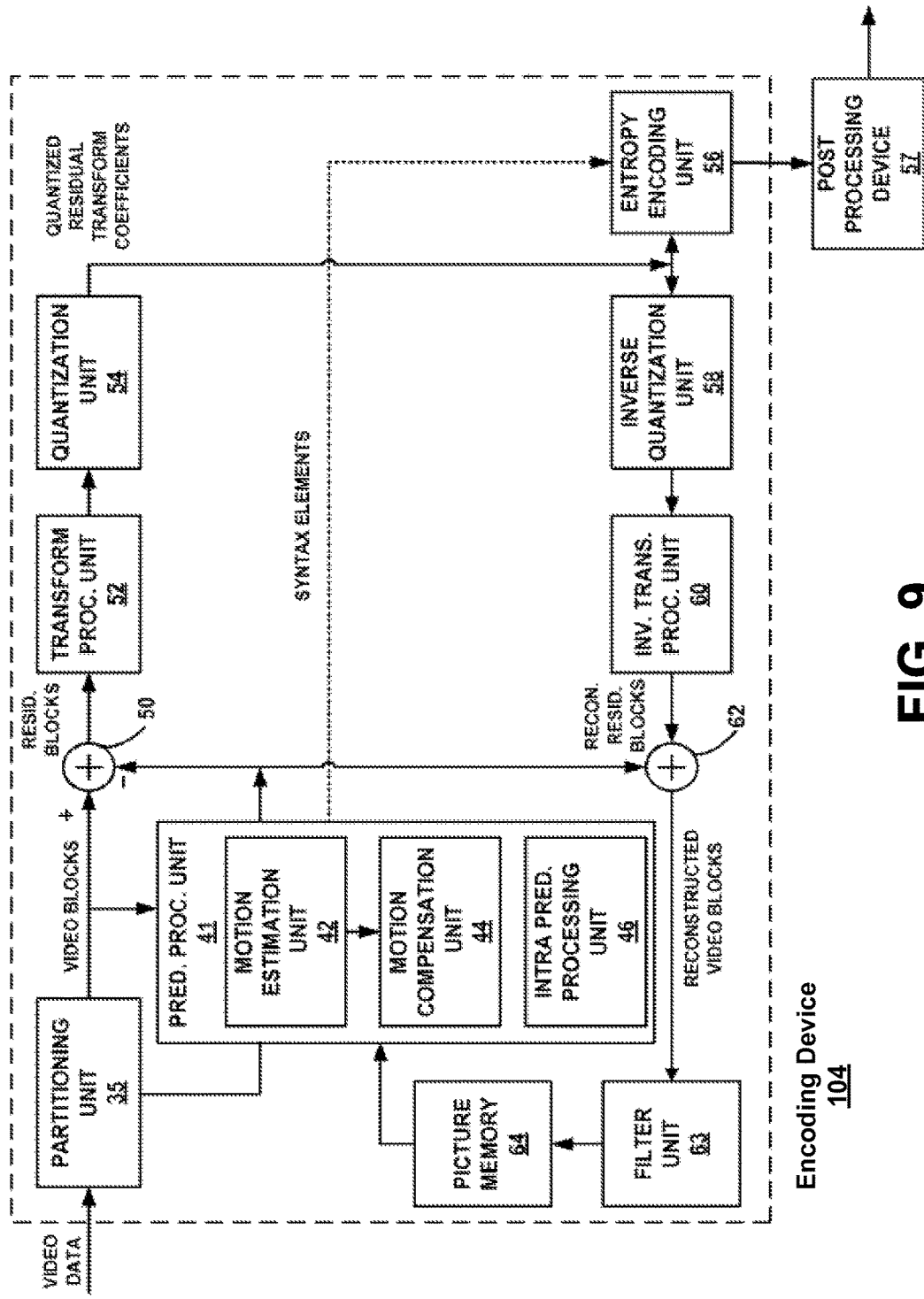
FIG. 9 is a block diagram illustrating an example video encoding device, in accordance with some embodiments.
Figure 10:
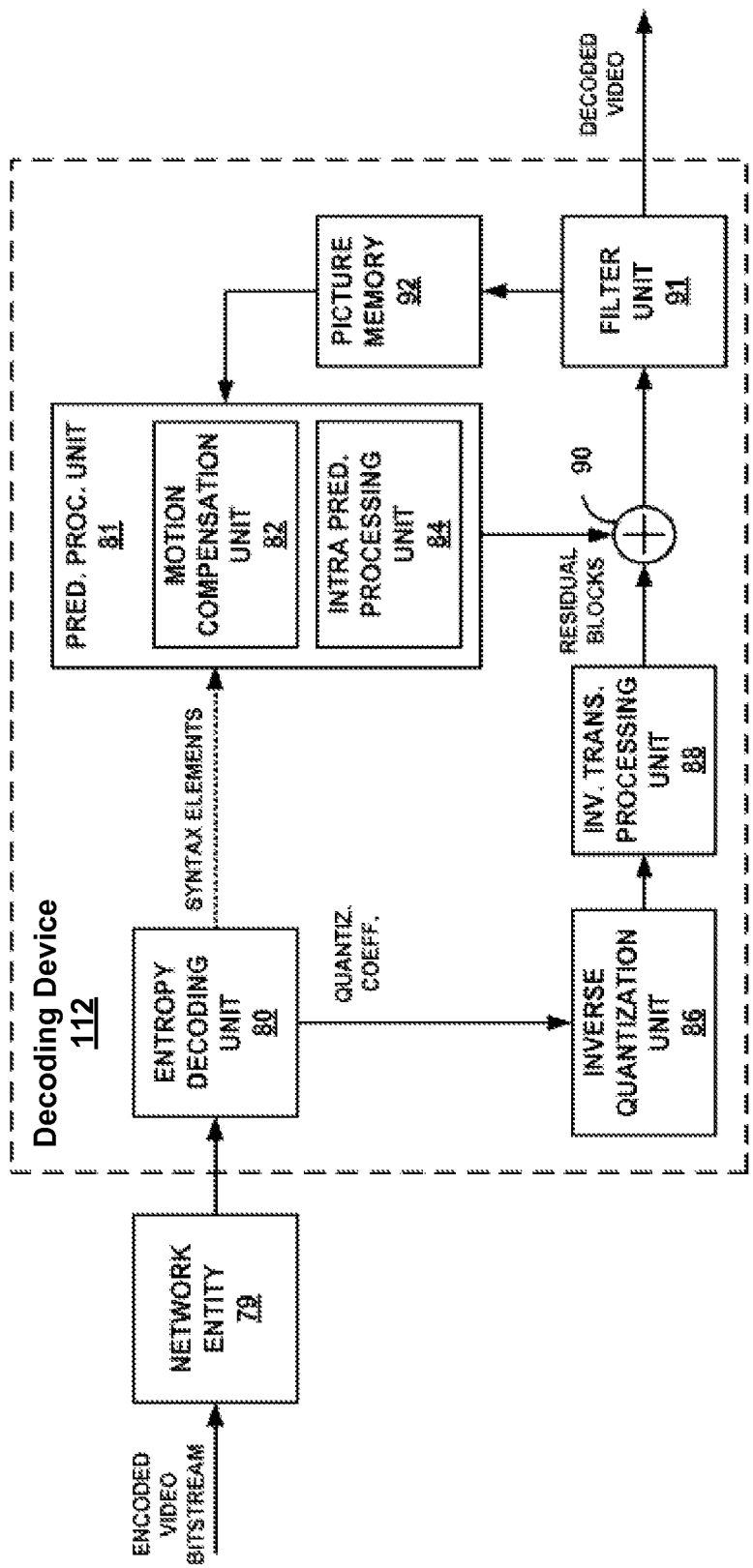
FIG. 10 is a block diagram illustrating an example video decoding device, in accordance with some embodiments.

Specific details of the encoding device 104 and the decoding device 112 are shown in FIG. 9 and FIG. 10, respectively. FIG. 9 is a block diagram illustrating an example encoding device 104 that may implement one or more of the techniques described in this disclosure. Encoding device 104 may, for example, generate the syntax structures described herein (e.g., the syntax structures of a VPS, SPS, PPS, or other syntax elements). Encoding device 104 may perform intra-prediction and inter-prediction coding of video blocks within video slices. As previously described, intra-coding relies, at least in part, on spatial prediction to reduce or remove spatial redundancy within a given video frame or picture. Inter-coding relies, at least in part, on temporal prediction to reduce or remove temporal redundancy within adjacent or surrounding frames of a video sequence. Intra-mode (I mode) may refer to any of several spatial based compression modes. Inter-modes, such as uni-directional prediction (P mode) or bi-prediction (B mode), may refer to any of several temporal-based compression modes.

The encoding device 104 includes a partitioning unit 35, prediction processing unit 41, filter unit 63, picture memory 64, summer 50, transform processing unit 52, quantization unit 54, and entropy encoding unit 56. Prediction processing unit 41 includes motion estimation unit 42, motion compensation unit 44, and intra-prediction processing unit 46. For video block reconstruction, encoding device 104 also includes inverse quantization unit 58, inverse transform processing unit 60, and summer 62. Filter unit 63 is intended to represent one or more loop filters such as a deblocking filter, an adaptive loop filter (ALF), and a sample adaptive offset (SAO) filter. Although filter unit 63 is shown in FIG. 9 as being an in loop filter, in other configurations, filter unit 63 may be implemented as a post loop filter. A post processing device 57 may perform additional processing on encoded video data generated by encoding device 104. The techniques of this disclosure may in some instances be implemented by encoding device 104. In other instances, however, one or more of the techniques of this disclosure may be implemented by post processing device 57.

As shown in FIG. 9, encoding device 104 receives video data, and partitioning unit 35 partitions the data into video blocks. The partitioning may also include partitioning into slices, slice segments, tiles, or other larger units, as wells as video block partitioning, e.g., according to a quadtree structure of LCUs and CUs. Encoding device 104 generally illustrates the components that encode video blocks within a video slice to be encoded. The slice may be divided into multiple video blocks (and possibly into sets of video blocks referred to as tiles). Prediction processing unit 41 may select one of a plurality of possible coding modes, such as one of a plurality of intra-prediction coding modes or one of a plurality of inter-prediction coding modes, for the current video block based on error results (e.g., coding rate and the level of distortion, or the like). Prediction processing unit 41 may provide the resulting intra- or inter-coded block to summer 50 to generate residual block data and to summer 62 to reconstruct the encoded block for use as a reference picture.

Intra-prediction processing unit 46 within prediction processing unit 41 may perform intra-prediction coding of the current video block relative to one or more neighboring blocks in the same frame or slice as the current block to be coded to provide spatial compression. Motion estimation unit 42 and motion compensation unit 44 within prediction processing unit 41 perform inter-predictive coding of the current video block relative to one or more predictive blocks in one or more reference pictures to provide temporal compression.

Motion estimation unit 42 may be configured to determine the inter-prediction mode for a video slice according to a predetermined pattern for a video sequence. The predetermined pattern may designate video slices in the sequence as P slices, B slices, or GPB slices. Motion estimation unit 42 and motion compensation unit 44 may be highly integrated, but are illustrated separately for conceptual purposes. Motion estimation, performed by motion estimation unit 42, is the process of generating motion vectors, which estimate motion for video blocks. A motion vector, for example, may indicate the displacement of a prediction unit (PU) of a video block within a current video frame or picture relative to a predictive block within a reference picture.

A predictive block is a block that is found to closely match the PU of the video block to be coded in terms of pixel difference, which may be determined by sum of absolute difference (SAD), sum of square difference (SSD), or other difference metrics. In some examples, encoding device 104 may calculate values for sub-integer pixel positions of reference pictures stored in picture memory 64. For example, encoding device 104 may interpolate values of one-quarter pixel positions, one-eighth pixel positions, or other fractional pixel positions of the reference picture. Therefore, motion estimation unit 42 may perform a motion search relative to the full pixel positions and fractional pixel positions and output a motion vector with fractional pixel precision.

Motion estimation unit 42 calculates a motion vector for a PU of a video block in an inter-coded slice by comparing the position of the PU to the position of a predictive block of a reference picture. The reference picture may be selected from a first reference picture list (List 0) or a second reference picture list (List 1), each of which identify one or more reference pictures stored in picture memory 64. Motion estimation unit 42 sends the calculated motion vector to entropy encoding unit 56 and motion compensation unit 44.

Motion compensation, performed by motion compensation unit 44, may involve fetching or generating the predictive block based on the motion vector determined by motion estimation, possibly performing interpolations to sub-pixel precision. Upon receiving the motion vector for the PU of the current video block, motion compensation unit 44 may locate the predictive block to which the motion vector points in a reference picture list. Encoding device 104 forms a residual video block by subtracting pixel values of the predictive block from the pixel values of the current video block being coded, forming pixel difference values. The pixel difference values form residual data for the block, and may include both luma and chroma difference components. Summer 50 represents the component or components that perform this subtraction operation. Motion compensation unit 44 may also generate syntax elements associated with the video blocks and the video slice for use by decoding device 112 in decoding the video blocks of the video slice.

Intra-prediction processing unit 46 may intra-predict a current block, as an alternative to the inter-prediction performed by motion estimation unit 42 and motion compensation unit 44, as described above. In particular, intra-prediction processing unit 46 may determine an intra-prediction mode to use to encode a current block. In some examples, intra-prediction processing unit 46 may encode a current block using various intra-prediction modes, e.g., during separate encoding passes, and intra-prediction unit processing 46 (or mode select unit 40, in some examples) may select an appropriate intra-prediction mode to use from the tested modes. For example, intra-prediction processing unit 46 may calculate rate-distortion values using a rate-distortion analysis for the various tested intra-prediction modes, and may select the intra-prediction mode having the best rate-distortion characteristics among the tested modes. Rate-distortion analysis generally determines an amount of distortion (or error) between an encoded block and an original, unencoded block that was encoded to produce the encoded block, as well as a bit rate (that is, a number of bits) used to produce the encoded block. Intra-prediction processing unit 46 may calculate ratios from the distortions and rates for the various encoded blocks to determine which intra-prediction mode exhibits the best rate-distortion value for the block.

In any case, after selecting an intra-prediction mode for a block, intra-prediction processing unit 46 may provide information indicative of the selected intra-prediction mode for the block to entropy encoding unit 56. Entropy encoding unit 56 may encode the information indicating the selected intra-prediction mode. Encoding device 104 may include in the transmitted bitstream configuration data definitions of encoding contexts for various blocks as well as indications of a most probable intra-prediction mode, an intra-prediction mode index table, and a modified intra-prediction mode index table to use for each of the contexts. The bitstream configuration data may include a plurality of intra-prediction mode index tables and a plurality of modified intra-prediction mode index tables (also referred to as codeword mapping tables).

After prediction processing unit 41 generates the predictive block for the current video block via either inter-prediction or intra-prediction, encoding device 104 forms a residual video block by subtracting the predictive block from the current video block. The residual video data in the residual block may be included in one or more TUs and applied to transform processing unit 52. Transform processing unit 52 transforms the residual video data into residual transform coefficients using a transform, such as a discrete cosine transform (DCT) or a conceptually similar transform. Transform processing unit 52 may convert the residual video data from a pixel domain to a transform domain, such as a frequency domain.

Transform processing unit 52 may send the resulting transform coefficients to quantization unit 54. Quantization unit 54 quantizes the transform coefficients to further reduce bit rate. The quantization process may reduce the bit depth associated with some or all of the coefficients. The degree of quantization may be modified by adjusting a quantization parameter. In some examples, quantization unit 54 may then perform a scan of the matrix including the quantized transform coefficients. Alternatively, entropy encoding unit 56 may perform the scan.

Following quantization, entropy encoding unit 56 entropy encodes the quantized transform coefficients. For example, entropy encoding unit 56 may perform context adaptive variable length coding (CAVLC), context adaptive binary arithmetic coding (CABAC), syntax-based context-adaptive binary arithmetic coding (SBAC), probability interval partitioning entropy (PIPE) coding or another entropy encoding technique. Following the entropy encoding by entropy encoding unit 56, the encoded bitstream may be transmitted to decoding device 112, or archived for later transmission or retrieval by decoding device 112. Entropy encoding unit 56 may also entropy encode the motion vectors and the other syntax elements for the current video slice being coded.

Inverse quantization unit 58 and inverse transform processing unit 60 apply inverse quantization and inverse transformation, respectively, to reconstruct the residual block in the pixel domain for later use as a reference block of a reference picture. Motion compensation unit 44 may calculate a reference block by adding the residual block to a predictive block of one of the reference pictures within a reference picture list. Motion compensation unit 44 may also apply one or more interpolation filters to the reconstructed residual block to calculate sub-integer pixel values for use in motion estimation. Summer 62 adds the reconstructed residual block to the motion compensated prediction block produced by motion compensation unit 44 to produce a reference block for storage in picture memory 64. The reference block may be used by motion estimation unit 42 and motion compensation unit 44 as a reference block to inter-predict a block in a subsequent video frame or picture.

In this manner, encoding device 104 of FIG. 9 represents an example of a video encoder configured to generate syntax for a encoded video bitstream. Encoding device 104 may, for example, generate VPS, SPS, and PPS parameter sets as described above. The encoding device 104 may perform any of the techniques described herein, including the processes described above with respect to FIG. 6 and FIG. 7. The techniques of this disclosure have generally been described with respect to encoding device 104, but as mentioned above, some of the techniques of this disclosure may also be implemented by post processing device 57.

FIG. 10 is a block diagram illustrating an example decoding device 112. The decoding device 112 includes an entropy decoding unit 80, prediction processing unit 81, inverse quantization unit 86, inverse transform processing unit 88, summer 90, filter unit 91, and picture memory 92. Prediction processing unit 81 includes motion compensation unit 82 and intra prediction processing unit 84. Decoding device 112 may, in some examples, perform a decoding pass generally reciprocal to the encoding pass described with respect to encoding device 104 from FIG. 9.

During the decoding process, decoding device 112 receives an encoded video bitstream that represents video blocks of an encoded video slice and associated syntax elements sent by encoding device 104. In some embodiments, the decoding device 112 may receive the encoded video bitstream from the encoding device 104. In some embodiments, the decoding device 112 may receive the encoded video bitstream from a network entity 79, such as a server, a media-aware network element (MANE), a video editor/splicer, or other such device configured to implement one or more of the techniques described above. Network entity 79 may or may not include encoding device 104. Some of the techniques described in this disclosure may be implemented by network entity 79 prior to network entity 79 transmitting the encoded video bitstream to decoding device 112. In some video decoding systems, network entity 79 and decoding device 112 may be parts of separate devices, while in other instances, the functionality described with respect to network entity 79 may be performed by the same device that comprises decoding device 112.

The entropy decoding unit 80 of decoding device 112 entropy decodes the bitstream to generate quantized coefficients, motion vectors, and other syntax elements. Entropy decoding unit 80 forwards the motion vectors and other syntax elements to prediction processing unit 81. Decoding device 112 may receive the syntax elements at the video slice level and/or the video block level. Entropy decoding unit 80 may process and parse both fixed-length syntax elements and variable-length syntax elements in or more parameter sets, such as a VPS, SPS, and PPS.

When the video slice is coded as an intra-coded (I) slice, intra prediction processing unit 84 of prediction processing unit 81 may generate prediction data for a video block of the current video slice based on a signaled intra-prediction mode and data from previously decoded blocks of the current frame or picture. When the video frame is coded as an inter-coded (i.e., B, P or GPB) slice, motion compensation unit 82 of prediction processing unit 81 produces predictive blocks for a video block of the current video slice based on the motion vectors and other syntax elements received from entropy decoding unit 80. The predictive blocks may be produced from one of the reference pictures within a reference picture list. Decoding device 112 may construct the reference frame lists, List 0 and List 1, using default construction techniques based on reference pictures stored in picture memory 92.

Motion compensation unit 82 determines prediction information for a video block of the current video slice by parsing the motion vectors and other syntax elements, and uses the prediction information to produce the predictive blocks for the current video block being decoded. For example, motion compensation unit 82 may use one or more syntax elements in a parameter set to determine a prediction mode (e.g., intra- or inter-prediction) used to code the video blocks of the video slice, an inter-prediction slice type (e.g., B slice, P slice, or GPB slice), construction information for one or more reference picture lists for the slice, motion vectors for each inter-encoded video block of the slice, inter-prediction status for each inter-coded video block of the slice, and other information to decode the video blocks in the current video slice.

Motion compensation unit 82 may also perform interpolation based on interpolation filters. Motion compensation unit 82 may use interpolation filters as used by encoding device 104 during encoding of the video blocks to calculate interpolated values for sub-integer pixels of reference blocks. In this case, motion compensation unit 82 may determine the interpolation filters used by encoding device 104 from the received syntax elements, and may use the interpolation filters to produce predictive blocks.

Inverse quantization unit 86 inverse quantizes, or de-quantizes, the quantized transform coefficients provided in the bitstream and decoded by entropy decoding unit 80. The inverse quantization process may include use of a quantization parameter calculated by encoding device 104 for each video block in the video slice to determine a degree of quantization and, likewise, a degree of inverse quantization that should be applied. Inverse transform processing unit 88 applies an inverse transform (e.g., an inverse DCT or other suitable inverse transform), an inverse integer transform, or a conceptually similar inverse transform process, to the transform coefficients in order to produce residual blocks in the pixel domain.

After motion compensation unit 82 generates the predictive block for the current video block based on the motion vectors and other syntax elements, decoding device 112 forms a decoded video block by summing the residual blocks from inverse transform processing unit 88 with the corresponding predictive blocks generated by motion compensation unit 82. Summer 90 represents the component or components that perform this summation operation. If desired, loop filters (either in the coding loop or after the coding loop) may also be used to smooth pixel transitions, or to otherwise improve the video quality. Filter unit 91 is intended to represent one or more loop filters such as a deblocking filter, an adaptive loop filter (ALF), and a sample adaptive offset (SAO) filter. Although filter unit 91 is shown in FIG. 10 as being an in loop filter, in other configurations, filter unit 91 may be implemented as a post loop filter. The decoded video blocks in a given frame or picture are then stored in picture memory 92, which stores reference pictures used for subsequent motion compensation. Picture memory 92 also stores decoded video for later presentation on a display device, such as video destination device 122 shown in FIG. 1.

In the foregoing description, aspects of the application are described with reference to specific embodiments thereof, but those skilled in the art will recognize that the invention is not limited thereto. Thus, while illustrative embodiments of the application have been described in detail herein, it is to be understood that the inventive concepts may be otherwise variously embodied and employed, and that the appended claims are intended to be construed to include such variations, except as limited by the prior art. Various features and aspects of the above-described invention may be used individually or jointly. Further, embodiments can be utilized in any number of environments and applications beyond those described herein without departing from the broader spirit and scope of the specification. The specification and drawings are, accordingly, to be regarded as illustrative rather than restrictive. For the purposes of illustration, methods were described in a particular order. It should be appreciated that in alternate embodiments, the methods may be performed in a different order than that described.

Where components are described as being "configured to" perform certain operations, such configuration can be accomplished, for example, by designing electronic circuits or other hardware to perform the operation, by programming programmable electronic circuits (e.g., microprocessors, or other suitable electronic circuits) to perform the operation, or any combination thereof.

The various illustrative logical blocks, modules, circuits, and algorithm steps described in connection with the embodiments disclosed herein may be implemented as electronic hardware, computer software, firmware, or combinations thereof. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present invention.

The techniques described herein may also be implemented in electronic hardware, computer software, firmware, or any combination thereof. Such techniques may be implemented in any of a variety of devices such as general purposes computers, wireless communication device handsets, or integrated circuit devices having multiple uses including application in wireless communication device handsets and other devices. Any features described as modules or components may be implemented together in an integrated logic device or separately as discrete but interoperable logic devices. If implemented in software, the techniques may be realized at least in part by a computer-readable data storage medium comprising program code including instructions that, when executed, performs one or more of the methods described above. The computer-readable data storage medium may form part of a computer program product, which may include packaging materials. The computer-readable medium may comprise memory or data storage media, such as random access memory (RAM) such as synchronous dynamic random access memory (SDRAM), read-only memory (ROM), non-volatile random access memory (NVRAM), electrically erasable programmable read-only memory (EEPROM), FLASH memory, magnetic or optical data storage media, and the like. The techniques additionally, or alternatively, may be realized at least in part by a computer-readable communication medium that carries or communicates program code in the form of instructions or data structures and that can be accessed, read, and/or executed by a computer, such as propagated signals or waves.

The program code may be executed by a processor, which may include one or more processors, such as one or more digital signal processors (DSPs), general purpose microprocessors, an application specific integrated circuits (ASICs), field programmable logic arrays (FPGAs), or other equivalent integrated or discrete logic circuitry. Such a processor may be configured to perform any of the techniques described in this disclosure. A general purpose processor may be a microprocessor; but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration. Accordingly, the term "processor," as used herein may refer to any of the foregoing structure, any combination of the foregoing structure, or any other structure or apparatus suitable for implementation of the techniques described herein. In addition, in some aspects, the functionality described herein may be provided within dedicated software modules or hardware modules configured for encoding and decoding, or incorporated in a combined video encoder-decoder (CODEC).

What is claimed is:

1. A method of decoding video data, the method comprising:
    accessing an encoded video bitstream comprising multiple layers, the encoded video bitstream including multiple access units, wherein a first access unit includes an end of sequence network abstraction layer unit, and wherein a second access unit includes an intra random access point picture and is a next subsequent access unit in decoding order following the first access unit;
    deriving a reinitialization flag to be a value indicating that decoding is to be reinitialized at the second access unit, wherein the reinitialization flag is derived to be the value based on the second access unit being the next subsequent access unit in decoding order following the end of sequence network abstraction layer unit of the first access unit; and
    reinitializing decoding at the second access unit based on the derived value of the reinitialization flag.

2. The method of claim 1, further comprising reinitializing decoding of each of the multiple layers at the second access unit based on the second access unit being the next subsequent access unit in decoding order following the end of sequence network abstraction layer unit of the first access unit.

3. The method of claim 1, wherein the first access unit includes the end of sequence network abstraction layer unit in a base layer of the encoded video bitstream and the second access unit includes the intra random access point picture in the base layer, and wherein decoding is reinitialized at the second access unit based on the second access unit including the intra random access point picture in the base layer and being the next subsequent access unit in decoding order following the end of sequence network abstraction layer unit of the first access unit.

4. The method of claim 1, wherein the intra random access point picture of the second access unit includes an instantaneous decoding refresh picture.

5. The method of claim 1, wherein the intra random access point picture of the second access unit includes a clean random access picture.

6. The method of claim 1, wherein a flag of the second access unit is set to a value when the second access unit is the next subsequent access unit in decoding order following the end of sequence network abstraction layer unit of the first access unit, the value indicating that the decoding is to be reinitialized at the second access unit.

7. The method of claim 6, wherein the flag includes a NoClrasOutputFlag and the value is a value of 1.

8. The method of claim 1, wherein reinitializing the decoding at the second access unit includes discarding one or more random access skipped leading pictures or one or more cross-layer random access skipped leading pictures associated with the second access unit.

9. An apparatus comprising:
a memory configured to store video data; and
a processor configured to:
access an encoded video bitstream comprising multiple layers from the memory, the encoded video bitstream including multiple access units, wherein a first access unit includes an end of sequence network abstraction layer unit, and wherein a second access unit includes an intra random access point picture and is a next subsequent access unit in decoding order following the first access unit;
derive a reinitialization flag to be a value indicating that decoding is to be reinitialized at the second access unit, wherein the reinitialization flag is derived to be the value based on the second access unit being the next subsequent access unit in decoding order following the end of sequence network abstraction layer unit of the first access unit; and
reinitialize decoding at the second access unit based on the value of the reinitialization flag.

10. The apparatus of claim 9, wherein the processor is configured to reinitialize decoding of each of the multiple layers at the second access unit based on the second access unit being the next subsequent access unit in decoding order following the end of sequence network abstraction layer unit of the first access unit.

11. The apparatus of claim 9, wherein the first access unit includes the end of sequence network abstraction layer unit in a base layer of the encoded video bitstream and the second access unit includes the intra random access point picture in the base layer, and wherein decoding is reinitialized at the second access unit based on the second access unit including the intra random access point picture in the base layer and being the next subsequent access unit in decoding order following the end of sequence network abstraction layer unit of the first access unit.

12. The apparatus of claim 9, wherein the intra random access point picture of the second access unit includes at least one or more of an instantaneous decoding refresh picture or a clean random access picture.

13. The apparatus of claim 9, wherein a flag of the second access unit is set to a value when the second access unit is the next subsequent access unit in decoding order following the end of sequence network abstraction layer unit of the first access unit, the value indicating that the decoding is to be reinitialized at the second access unit.

14. The apparatus of claim 9, wherein reinitializing the decoding at the second access unit includes discarding one or more random access skipped leading pictures or one or more cross-layer random access skipped leading pictures associated with the second access unit.

15. A method of processing video data, the method comprising:
obtaining a first encoded video bitstream comprising multiple layers, the first encoded video bitstream including multiple access units;
obtaining a second encoded video bitstream comprising multiple layers, the second encoded video bitstream including multiple access units;
generating a third encoded video bitstream by combining access units in the first encoded video bitstream with access units in the second encoded video bitstream, and by inserting an end of sequence network abstraction layer unit into a first access unit of the first encoded video bitstream, wherein a second access unit of the second encoded video bitstream includes an intra random access point picture and is a next subsequent access unit in decoding order following the first access unit with the end of sequence network abstraction layer unit; and
transmitting the third encoded video bitstream, wherein the second access unit being the next subsequent access unit in decoding order following the end of sequence network abstraction layer unit of the first access unit causes decoding of the third encoded video bitstream to be reinitialized at the second access unit.

16. The method of claim 15, further comprising:
determining that the third encoded video bitstream is to be decoded, the third encoded bitstream including the access units in the first encoded video bitstream up to and inclusive of the first access unit, followed by the access units in the second encoded video bitstream starting from and inclusive of the second access unit;
determining that decoding of the second encoded video bitstream is to be reinitialized at the second access unit including the intra random access point picture; and
generating the third encoded video bitstream by combining the access units in the first encoded video bitstream up to and inclusive of the first access unit with the access units in the second encoded video bitstream starting from and inclusive of the second access unit, and by inserting the end of sequence network abstraction layer unit into the first access unit.

17. The method of claim 15, wherein the first encoded video bitstream and the second encoded video bitstream are a same encoded video bitstream, and wherein the second access unit is a subsequent access unit in decoding order following the first access unit in the same encoded video bitstream.

18. The method of claim 15, wherein decoding of each layer of multiple layers of the third encoded video bitstream is reinitialized at the second access unit based on the second access unit being the next subsequent access unit in decoding order following the end of sequence network abstraction layer unit of the first access unit.

19. The method of claim 15, wherein the end of sequence network abstraction layer unit is inserted into the first access unit in a base layer of the third encoded video bitstream and the second access unit includes the intra random access point picture in the base layer, and wherein the second access unit including the intra random access point picture in the base layer and being the next subsequent access unit in decoding order following the end of sequence network abstraction layer unit of the first access unit causes decoding of the third encoded video bitstream to be reinitialized at the second access unit.

20. The method of claim 15, wherein the intra random access point picture of the second access unit includes an instantaneous decoding refresh picture.

21. The method of claim 15, wherein the intra random access point picture of the second access unit includes a clean random access picture.

22. The method of claim 15, wherein a flag of the second access unit is set to a value when the second access unit is the next subsequent access unit in decoding order following the end of sequence network abstraction layer unit of the first access unit, the value indicating that the decoding is to be reinitialized at the second access unit.

23. The method of claim 22, wherein the flag includes a NoClrasOutputFlag and the value is a value of 1.

24. The method of claim 15, wherein reinitializing the decoding at the second access unit includes discarding one or more random access skipped leading pictures or one or more cross-layer random access skipped leading pictures associated with the second access unit.

25. An apparatus comprising:
a memory configured to store video data;
a processor configured to:
   obtain a first encoded video bitstream comprising multiple layers from the memory, the first encoded video bitstream including multiple access units;
   obtain a second encoded video bitstream comprising multiple layers from the memory, the second encoded video bitstream including multiple access units; and
   generate a third encoded video bitstream by combining access units in the first encoded video bitstream with access units in the second encoded video bitstream, and by inserting an end of sequence network abstraction layer unit into a first access unit of the first encoded video bitstream, wherein a second access unit of the second encoded video bitstream includes an intra random access point picture and is a next subsequent access unit in decoding order following the first access unit with the end of sequence network abstraction layer unit; and
a transmitter configured to transmit the third encoded video bitstream, wherein the second access unit being the next subsequent access unit in decoding order following the end of sequence network abstraction layer unit of the first access unit causes decoding of the third encoded video bitstream to be reinitialized at the second access unit.

26. The apparatus of claim 25, wherein the processor is configured to:
   determine that the third encoded video bitstream is to be decoded, the third encoded bitstream including the access units in the first encoded video bitstream up to and inclusive of the first access unit, followed by the access units in the second encoded video bitstream starting from and inclusive of the second access unit;
   determine that decoding of the second encoded video bitstream is to be reinitialized at the second access unit including the intra random access point picture; and
   generate the third encoded video bitstream by combining the access units in the first encoded video bitstream up to and inclusive of the first access unit with the access units in the second encoded video bitstream starting from and inclusive of the second access unit, and by inserting the end of sequence network abstraction layer unit into the first access unit.

27. The apparatus of claim 25, wherein the first encoded video bitstream and the second encoded video bitstream are a same encoded video bitstream, and wherein the second access unit is a subsequent access unit in decoding order following the first access unit in the same encoded video bitstream.

28. The apparatus of claim 25, wherein decoding of each layer of multiple layers of the third encoded video bitstream is reinitialized at the second access unit based on the second access unit being the next subsequent access unit in decoding order following the end of sequence network abstraction layer unit of the first access unit.

29. The apparatus of claim 25, wherein the end of sequence network abstraction layer unit is inserted into the first access unit in a base layer of the third encoded video bitstream and the second access unit includes the intra random access point picture in the base layer, and wherein the second access unit including the intra random access point picture in the base layer and being the next subsequent access unit in decoding order following the end of sequence network abstraction layer unit of the first access unit causes decoding of the third encoded video bitstream to be reinitialized at the second access unit.

30. The apparatus of claim 25, wherein the intra random access point picture of the second access unit includes at least one or more of an instantaneous decoding refresh picture or a clean random access picture.

* * * * *